US012776818B2

(12) United States Patent
Liu

(10) Patent No.: US 12,776,818 B2
(45) Date of Patent: Oct. 27, 2026

(54) MODEL PROCESSING METHOD, ELECTRONIC DEVICE, NETWORK DEVICE, AND TERMINAL DEVICE

(71) Applicant: GUANGDONG OPPO MOBILE TELECOMMUNICATIONS CORP., LTD., Dongguan (CN)

(72) Inventor: Wendong Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 290 days.

(21) Appl. No.: 18/591,693

(22) Filed: Feb. 29, 2024

(65) Prior Publication Data

US 2024/0259072 A1 Aug. 1, 2024

Related U.S. Application Data

(63) Continuation of application No. PCT/CN2021/116244, filed on Sep. 2, 2021.

(51) Int. Cl.
*H04B 7/06* (2006.01)

(52) U.S. Cl.
CPC ......... *H04B 7/0639* (2013.01); *H04B 7/0626* (2013.01)

(58) Field of Classification Search
CPC ............................ H04B 7/0639; H04B 7/0626
USPC .......................................................... 370/329
See application file for complete search history.

(56) References Cited

U.S. PATENT DOCUMENTS

| | | | | |
|---|---|---|---|---|
| 10,217,047 | B2 | 2/2019 | O'Shea | |
| 2018/0322388 | A1 | 11/2018 | O'Shea | |
| 2019/0188565 | A1 | 6/2019 | O'Shea | |
| 2020/0366537 | A1 | 11/2020 | Wang et al. | |
| 2021/0273707 | A1* | 9/2021 | Yoo | G06N 20/00 |
| 2023/0188302 | A1* | 6/2023 | Vitthaladevuni | H04L 5/0048 370/329 |

(Continued)

FOREIGN PATENT DOCUMENTS

| | | | |
|---|---|---|---|
| CN | 111512323 | A | 8/2020 |
| CN | 111680787 | A | 9/2020 |

(Continued)

OTHER PUBLICATIONS

Supplementary European Search Report in the European application No. 21955488.8, mailed on May 23, 2025, 9 pages.

(Continued)

*Primary Examiner* — Faisal Choudhury
(74) *Attorney, Agent, or Firm* — Ladas & Parry LLP

(57) ABSTRACT

A model processing method, an electronic device, a network device, a terminal device, a chip, a computer readable storage medium, a computer program product, and a computer program are provided. The method includes: an electronic device updates a channel feedback model on the basis of N first feedback information tags respectively corresponding to N pieces of channel information. The channel feedback model is used for obtaining corresponding feedback information on the basis of channel information to be fed back, and the N first feedback information tags comprise N pieces of codebook output information obtained by respectively quantifying the N pieces of channel information on the basis of a codebook.

19 Claims, 12 Drawing Sheets

(56) References Cited

U.S. PATENT DOCUMENTS

| | | | | |
|---|---|---|---|---|
| 2024/0154675 A1* | 5/2024 | Shi | ........................ | H04B 7/0626 |
| 2024/0313838 A1* | 9/2024 | Wu | ...................... | H04B 7/0626 |

FOREIGN PATENT DOCUMENTS

| | | |
|---|---|---|
| CN | 113098804 A | 7/2021 |
| CN | 113162667 A | 7/2021 |

OTHER PUBLICATIONS

International Search Report in the international application No. PCT/CN2021/116244, mailed on Dec. 27, 2021, 5 pages with English translation.

English translation of the Written Opinion of the International Search Authority in the international application No. PCT/CN2021/116244, mailed on Dec. 27, 2021, 8 pages with English translation.

* cited by examiner

MODEL PROCESSING METHOD, ELECTRONIC DEVICE, NETWORK DEVICE, AND TERMINAL DEVICE

CROSS-REFERENCE TO RELATED APPLICATION

The present disclosure is a US continuation application of International Application No. PCT/CN2021/116244, filed on Sep. 2, 2021. The disclosure of the above application is hereby incorporated by reference in its entirety.

BACKGROUND

In a New Radio (NR) system, a Channel State Information (CSI) feedback solution usually uses codebook-based feature vectors to perform feedback, to enable a base station to obtain downlink CSI. Since the codebook itself cannot be adjusted according to real-time variation of a channel environment, this solution introduces large errors in the codebook feedback obtained by the base station compared to original CSI.

In view of Artificial Intelligence (AI) technologies, especially deep learning achieving great success in aspects such as computer vision, natural language processing or the like, the field of communications has begun to try to use deep learning to solve technical problems which are difficult to be solved by traditional communication methods. For example, in the CSI feedback solution, a user may use an encoder network (Encoder) of an AI autoencoder to compress and send the CSI, and the base station side may use a decoder network (Decoder) of the autoencoder to reconstruct the CSI. However, a deep learning-based CSI autoencoder has poor generalization performance and stability.

SUMMARY

In view of this, embodiments of the disclosure provide a method for processing model, an electronic device, a network device, a terminal device, a chip, a computer-readable storage medium, a computer program product, and a computer program, which may be used for CSI feedback in a communication system.

The disclosure relates to the field of communications, and more particularly, to a method for processing model, an electronic device, a network device, a terminal device, a chip, a computer-readable storage medium, a computer program product, and a computer program.

An embodiment of the disclosure provides a method for processing model, the method includes the following operations.

An electronic device updates a channel feedback model based on N first feedback information tags respectively corresponding to N pieces of channel information.

The channel feedback model is used to obtain corresponding feedback information based on channel information which needs to be feedback, the N first feedback information tags include N pieces of codebook output information obtained by respectively quantizing, based on a codebook, the N pieces of channel information; and N is an integer greater than or equal to 1.

An embodiment of the disclosure further provides a method for processing model, the method includes the following operations.

A network device receives, from a terminal device, N pieces of codebook output information and N bitstreams respectively corresponding to N pieces of channel information, the N bitstreams are obtained by the terminal device respectively processing the N pieces of channel information by using an encoder in a channel feedback model, the N pieces of codebook output information are obtained by the terminal device respectively quantizing, based on a codebook, the N pieces of channel information.

The network device obtains N first feedback information tags based on the N pieces of codebook output information, and updates a decoder in the channel feedback model based on the N bitstreams and the N first feedback information tags.

The decoder is configured to perform decoding based on a to-be-decoded bitstream received from the terminal device, to obtain corresponding feedback information.

An embodiment of the disclosure further provides a method for processing model, the method includes the following operations.

A terminal device respectively processes N pieces of channel information by using an encoder in a channel feedback model to obtain N bitstreams; and quantizes the N pieces of channel information based on a codebook respectively to obtain N pieces of codebook output information.

The terminal device sends the N bitstreams and the N pieces of codebook output information to a network device; the N pieces of codebook output information are used to obtain N first feedback information tags, and the N bitstreams and the N first feedback information tags are used by the network device to update a decoder in the channel feedback model, the decoder is configured to perform decoding based on a to-be-decoded bitstream of the terminal device to obtain corresponding feedback information.

An embodiment of the disclosure further provides an electronic device, the electronic device includes a first training module.

The first training module is configured to update a channel feedback model based on N first feedback information tags respectively corresponding to N pieces of channel information.

The N first feedback information tags include N pieces of codebook output information obtained by respectively quantizing, based on a codebook, the N pieces of channel information; the channel feedback model is used to obtain corresponding feedback information based on channel information which needs to be feedback, and N is an integer greater than or equal to 1.

An embodiment of the disclosure further provides a network device, the network device includes a second communication module and a first processing module.

The second communication module is configured to receive, from a terminal device, N pieces of codebook output information and N bitstreams respectively corresponding to N pieces of channel information, the N bitstreams are obtained by the terminal device respectively processing the N pieces of channel information by using an encoder in a channel feedback model, the N pieces of codebook output information are obtained by the terminal device respectively quantizing, based on a codebook, the N pieces of channel information.

The first processing module is configured to obtain N first feedback information tags based on the N pieces of codebook output information, and update a decoder in the channel feedback model based on the N bitstreams and the N first feedback information tags.

The decoder is configured to perform decoding based on a to-be-decoded bitstream received from the terminal device to obtain corresponding feedback information.

An embodiment of the disclosure further provides a terminal device, the terminal device includes a second processing module and a third communication module.

The second processing module is configured to respectively process N pieces of channel information by using an encoder in a channel feedback model to obtain N bitstreams; and quantize the N pieces of channel information based on a codebook respectively to obtain N pieces of codebook output information.

The third communication module is configured to send the N bitstreams and the N pieces of codebook output information to a network device. Herein, the N pieces of codebook output information are used to obtain N first feedback information tags; the N bitstreams and the N first feedback information tags are used by the network device to update a decoder in the channel feedback model, and the decoder is configured to perform decoding based on a to-be-decoded bitstream of the terminal device to obtain corresponding feedback information.

An embodiment of the disclosure further provides an electronic device, the electronic device includes a processor and a memory configured to store a computer program, and the processor is configured to call and run the computer program stored in the memory, to execute the method for processing model provided in any one of the embodiments of the disclosure.

An embodiment of the disclosure further provides a network device, the network device includes a processor and a memory configured to store a computer program, and the processor is configured to call and run the computer program stored in the memory, to execute the method for processing model provided in any one of the embodiments of the disclosure.

An embodiment of the disclosure further provides a terminal device, the terminal device includes a processor and a memory configured to store a computer program, and the processor is configured to call and run the computer program stored in the memory, to execute the method for processing model provided in any one of the embodiments of the disclosure.

An embodiment of the disclosure further provides a chip, the chip includes a processor, the processor is configured to call and run a computer program from a memory, to enable a device mounted with the chip to execute the method for processing model provided in any one of the embodiments of the disclosure.

An embodiment of the disclosure further provides a computer-readable storage medium, the computer-readable storage medium is configured to store a computer program, and the computer program enables a computer to execute the method for processing model provided in any one of the embodiments of the disclosure.

An embodiment of the disclosure further provides a computer program product, the computer program product includes computer program instructions, and the computer program instructions enable a computer to execute the method for processing model provided in any one of the embodiments of the disclosure.

An embodiment of the disclosure further provides a computer program, the computer program enables a computer to execute the method for processing model provided in any one of the embodiments of the disclosure.

DETAILED DESCRIPTION

Figure 1:
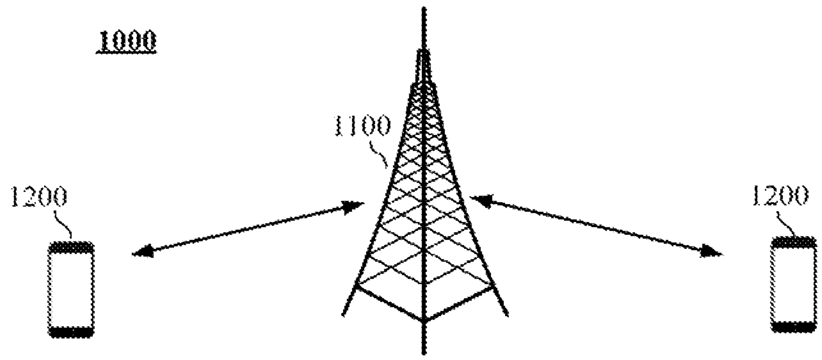
FIG. 1 is a schematic diagram of an architecture of a communication system according to an embodiment of the disclosure.

Technical solutions of the embodiments of the disclosure use the codebook output information obtained based on the codebook and channel information as the feedback information tag, to update the channel feedback model. Since a tag information-based deep learning training mode is used, the channel feedback model may accurately obtain corresponding feedback information based on to-be-predicted channel information. Furthermore, since output of the codebook is introduced into training links of the model, output of the model may have advantages of the output of the codebook, which is applicable to various communication scenarios while has good CSI recovery accuracy, generalization and stability.

The technical solutions in the embodiments of the disclosure will be described below with reference to the drawings in the embodiments of the disclosure.

The technical solutions of the embodiments of the disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of the NR system, a LTE-based access to unlicensed spectrum (LTE-U) system, a NR-based access to unlicensed spectrum (NR-U) system, a Non-Terrestrial Networks (NTN) system, a Universal Mobile Telecommunication System (UMTS), a Wireless Local Area Network (WLAN), Wireless Fidelity (WiFi), a 5th-Generation (5G) system, or other communication systems, etc.

In general, the number of connections supported by traditional communication systems is limited and easy to be implemented. However, with the development of communication technologies, mobile communication systems will not only support traditional communication, but also support for example Device to Device (D2D) communication, Machine to Machine (M2M) communication, Machine Type Communication (MTC), Vehicle to Vehicle (V2V) communication, or Vehicle to everything (V2X) communication, etc. The embodiments of the disclosure may also be applied to these communication systems.

Optionally, the communication systems in the embodiments of the disclosure may be applied to a Carrier Aggregation (CA) scenario, or may be applied to a Dual Connectivity (DC) scenario, or may be applied to a Standalone (SA) networking scenario.

The embodiments of the disclosure describe various embodiments in conjunction with a network device and a terminal device, the terminal device may also be referred to as a User Equipment (UE), an access terminal, a user unit, a user station, a mobile radio station, a mobile station, a remote station, a remote terminal, a mobile device, a user terminal, a terminal, a wireless communication device, a user agent, or a user device, etc.

The terminal device may be a station (ST) in WLAN, and may be a cellular phone, a cordless phone, a Session Initiation Protocol (SIP) phone, a Wireless Local Loop (WLL) station, a Personal Digital Assistant (PDA) device, a hand-held device with a wireless communication function, a computing device, or other processing devices connected to a wireless modem, a vehicle-mounted device, a wearable device, a next-generation communication system such as a terminal device in an NR network, or a terminal device in a future evolutional Public Land Mobile Network (PLMN) network, etc.

In the embodiments of the disclosure, the terminal device may be deployed on land (including indoor or outdoor, hand-held, wearable or vehicle-mounted); or, the terminal device may be deployed on water (such as a ship, etc.); or, the terminal device may be deployed in the air (such as an aircraft, a balloon, a satellite, etc.).

In the embodiments of the disclosure, the terminal device may be a mobile phone, a pad, a computer with a wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in a smart grid, a wireless terminal device in transportation safety, a wireless terminal device in a smart city, or a wireless terminal device in a smart home, etc.

As an example rather than limitation, in the embodiments of the disclosure, the terminal device may also be a wearable device. The wearable device may also be referred to as a wearable smart device, which is a generic term for wearable devices developed by applying wearable technologies to intelligently design daily wear (such as glasses, gloves, watches, clothes, shoes, etc). The wearable device is a portable device which is directly worn on the body or integrated into the user's clothes or accessories. The wearable device is not only a hardware device, but also achieve powerful functions through software support, data interaction and cloud interaction. Generalized wearable smart devices include devices with full functions and large sizes, which may achieve complete or partial functions without relying on smart phones, such as smart watches, or smart glasses, or the like; and devices which focus on only a certain type of application functions, and need to be used in cooperation with other devices such as smart phones, such as various smart bracelets, smart jewelry or the like for monitoring physical signs.

In the embodiments of the disclosure, the network device may be a device configured to communicate with the mobile device, and the network device may be an Access Point (AP) in WLAN, a Base Transceiver Station (BTS) in GSM or CDMA, or may be a NodeB (NB) in WCDMA, or may be an evolutional Node B (eNB or eNodeB) in LTE, or a relay station or AP, or a vehicle-mounted device, a wearable device, a network device (gNB) in the NR network, or a network device in the future evolutional PLMN network, etc.

As an example rather than limitation, in the embodiments of the disclosure, the network device may have mobility characteristics, for example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station arranged at positions such as land, water, etc.

In the embodiments of the disclosure, the network device may provide services for a cell, the terminal device communicates with the network device through transmission resources (such as frequency domain resources, or spectrum resources) used by the cell, the cell may be a cell corresponding to a network device (such as a base station), and the cell may belong to a macro base station, or may belong to a base station corresponding to a small cell. Here, the small cell may include a metro cell, a micro cell, a pico cell, a femto cell, etc. These small cells have characteristics of small coverage and low transmission power, and are suitable for providing high-speed data transmission services.

FIG. 1 schematically shows a wireless communication system 1000 including one network device 1100 and two terminal devices 1200. Optionally, the wireless communication system 1000 may include multiple network devices 1100, and other numbers of terminal devices may be included in coverage of each of the network devices 1100, which are not limited in the embodiments of the disclosure. Optionally, the wireless communication system 1000 illustrated in FIG. 1 may further include other network entities such as a Mobility Management Entity (MME), an Access and Mobility Management Function (AMF), or the like, which are not limited in the embodiments of the disclosure.

It should be understood that in the embodiments of the disclosure, a device with a communication function in the network/system may be referred to as a communication device. Taking the communication system illustrated in FIG. 1 as an example, the communication device may include a network device and a terminal device with communication functions, and the network device and the terminal device may be specific devices in the embodiments of the disclosure, which are not elaborated here. The communication device may further include other devices in the communication system, such as a network controller, MME or other network entities, which are not limited in the embodiments of the disclosure.

It should be understood that terms "system" and "network" here are often used interchangeably in the context. In the context, a term "and/or" is intended to describe an association relationship of associated objects, for example, it indicates that there may be three relationships between anterior and posterior associated objects. For example, A and/or B may indicate three situations: A exists alone, A and B exist simultaneously, and B exists alone. In the context, a character "/" usually indicates that anterior and posterior associated objects are in a "or" relationship.

It should be understood that "indication" mentioned in the embodiments of the disclosure may be a direct indication, or may be an indirect indication, or may mean that there is an association relationship. For example, A indicates B, which may mean that: A directly indicates B, for example, B may be obtained through A; or, A indirectly indicates B, for example, A indicates C, and B may be obtained through C; or, there is an association relationship between A and B.

In descriptions of the embodiments of the disclosure, a term "corresponding" may mean that there are direct or indirect correspondences between two items; or, may mean that there is an association relationship between two items; or, may be in a relationship such as indicating and indicated, configuring and configured, etc.

In order to facilitate understanding the technical solutions of the embodiments of the disclosure, related technologies of the embodiments of the disclosure are described below. The following related technologies used as optional solutions may be arbitrarily combined with the technical solutions of the embodiments of the disclosure, all of which belong to the scope of protection of the embodiments of the disclosure.

(1) Codebook-Based CSI Feedback Solution in NR System

In a current NR system, with respect to a CSI feedback solution, codebook-based feature vector feedback is usually used to enable a base station to obtain downlink CSI. Specifically, the base station sends a downlink Channel State Information Reference Signal (CSI-RS) to a user, and the user uses the CSI-RS to estimate CSI of a downlink channel, and performs feature value decomposition on the estimated downlink channel to obtain a feature vector corresponding to the downlink channel. Furthermore, NR provides two codebook designs of Type 1 and Type 2. The Type 1 codebook is used for CSI feedback with conventional precision, and transmission of Single-User Multiple Input Multiple Output (SU-MIMO) and Multi-User Multiple Input Multiple Output (MU-MIMO), the Type 2 codebook is intended to improve transmission performance of MU-MIMO. Both the Type 1 codebook and the Type 2 codebook use two-level codebook feedback with $W=W_1W_2$, here $W_1$ describes bandwidth and long-term characteristics of the channel, and is used to determine a set of L Discrete Fourier Transform (DFT) beams; $W_2$ describes sub-band and short-term characteristics of the channel. In particular, for the Type 1 codebook, $W_2$ is used to select a beam from the L DFT beams; for the Type 2 codebook, $W_2$ is used to linearly combine the L DFT beams in $W_1$, and feed back in a form of amplitude and phase. In general, the Type 2 codebook uses a higher number of feedback bits to obtain CSI feedback performance with higher precision.

(2) Neural Network and Deep Learning

Figure 2:
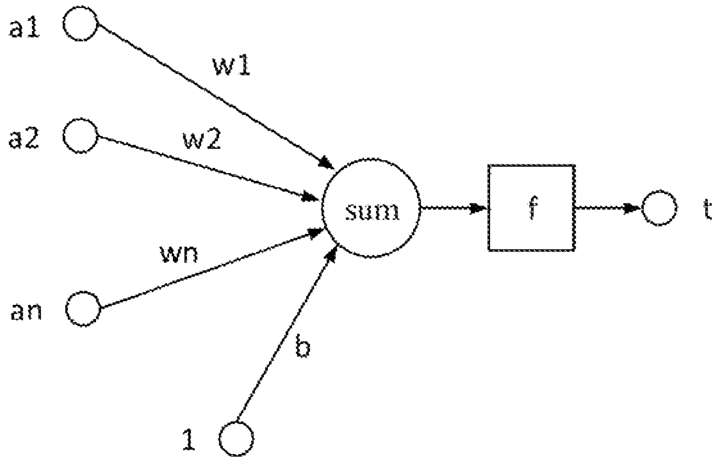
FIG. 2 is a schematic diagram of a neuron structure according to an embodiment of the disclosure.
Figure 3:
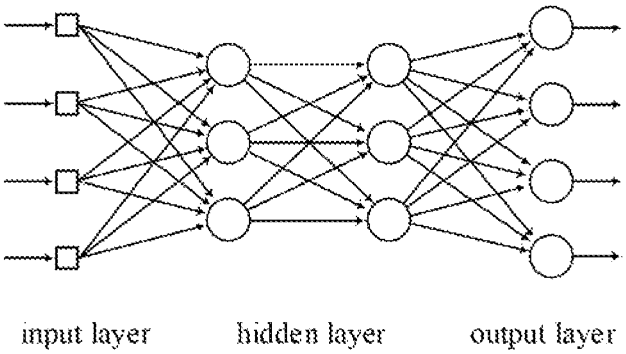
FIG. 3 is a schematic diagram of a neural network according to an embodiment of the disclosure.

A neural network is an operational model composed of multiple neuron nodes connected to each other. The neuron structure is illustrated in FIG. 2, in which connection between nodes represents a weighted value from an input signal to an output signal, referred to as a weight. For example, weights between nodes a1, a2, an, and a summing node are w1, w2, wn respectively. Each node performs a weighted sum of different input signals and outputs them through a specific activation function f. A simple neural network is illustrated in FIG. 3, which includes an input layer, a hidden layer and an output layer. Different outputs may be generated through different connection manners, weights and activation functions of multiple neurons, and then a mapping relationship from input to output is fitted.

Deep learning uses a deep neural network with multiple hidden layers, which greatly improves an ability of the network to learn features, and may fit complex non-linear mapping from input to output, therefore it is widely used in the fields of speech and image processing. In addition to the deep neural network, deep learning further includes common basic structures such as a Convolutional Neural Network (CNN), a Recurrent Neural Network (RNN) or the like for different tasks.

Figure 4:
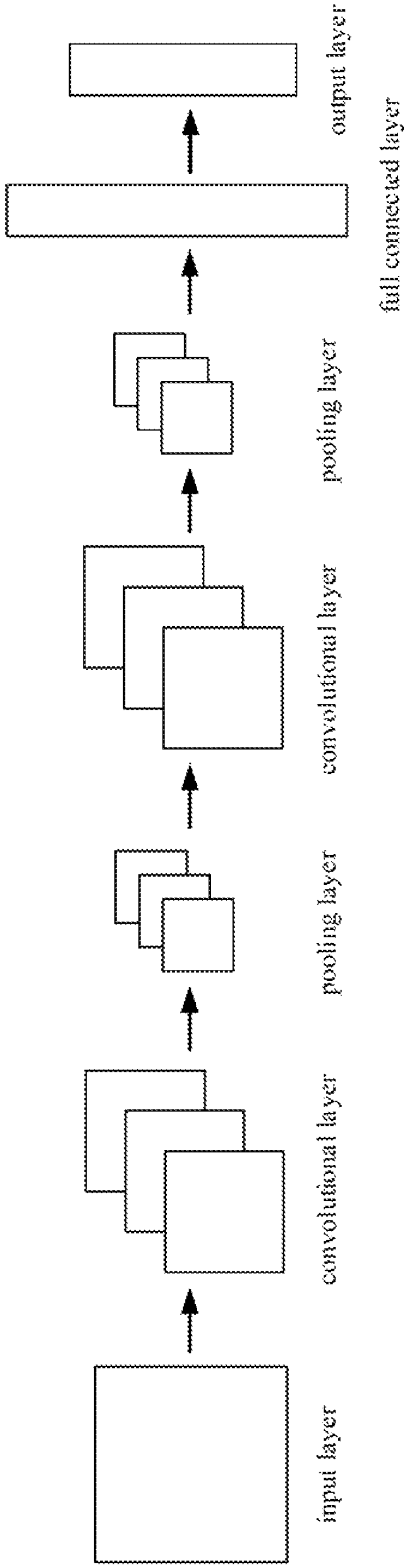
FIG. 4 is a schematic diagram of a Convolutional Neural Network (CNN) according to an embodiment of the disclosure.

As illustrated in FIG. 4, a basic structure of the CNN includes an input layer, multiple convolutional layers, multiple pooling layers, a full connected layer, and an output layer. Each neuron of a convolutional kernel in the convolutional layer is locally connected to its input, and a local maximum value or average value feature of a certain layer is extracted by introducing the pooling layers, which effectively reduces parameters of the network and exploits local features, so that the convolutional neural network may converge quickly and obtain excellent performance.

Figure 5:
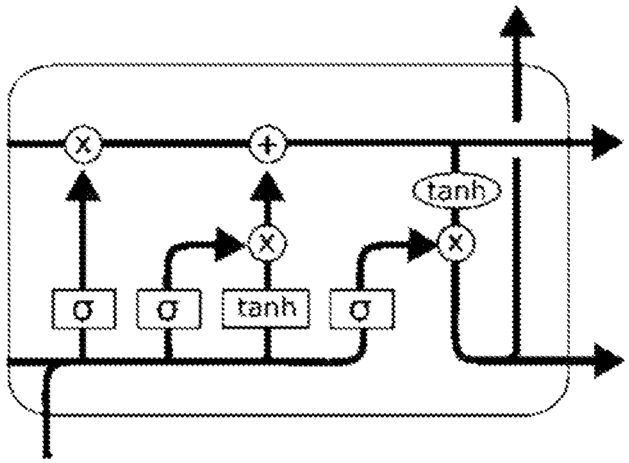
FIG. 5 is a schematic diagram of a Long Short-Term Memory (LSTM) unit structure according to an embodiment of the disclosure.

The RNN is a neural network which models sequence data, and has achieved remarkable accomplishments in the natural language processing field, for example, application fields such as machine translation, speech recognition, etc. Specific representation is that the network memorizes information of a past moment and uses the information in calculation of a current output, that is, nodes between the hidden layers are not disconnected any more, instead, the nodes are connected, and inputs of the hidden layer include not only the input layer but also output of the hidden layer at a previous moment. Commonly used RNNs include structures such as Long Short-Term Memory (LSTM), Gated Recurrent Unit (GRU), etc. FIG. 5 illustrates a basic structure of a LSTM unit. Different from a traditional RNN which considers only the most recent state, a cell state of the LSTM may determine which states should be retained and which states should be forgotten, which solves defects of the traditional RNN on long-term memory.

(3) Deep Learning-Based Channel Information Feedback Method

In view of AI technologies, especially deep learning achieving great success in aspects such as computer vision, natural language processing or the like, the field of communications has begun to try to use deep learning to solve technical problems which are difficult to be solved by traditional communication methods, such as CSI feedback. An architecture of the neural network commonly used in deep learning is non-linear and data-driven, features may be extracted from an actual channel matrix data, and channel matrix information compressed and fed back by the UE end may be recovered at the base station side as much as possible, which ensures to recover channel information while provide a possibility of reducing overhead of the CSI feedback at the UE side.

Figure 6:
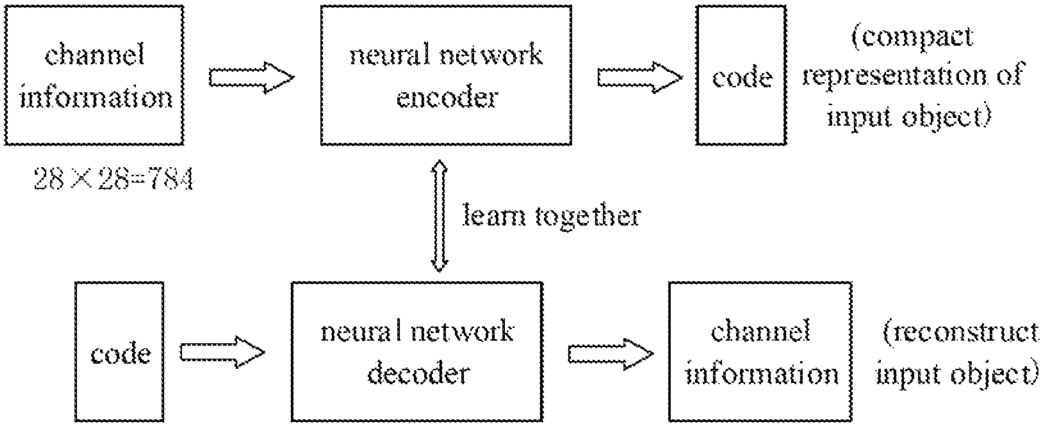
FIG. 6 is a schematic diagram of a deep learning-based CSI feedback solution based on deep learning according to an embodiment of the disclosure.

As illustrated in FIG. 6, the deep learning-based CSI feedback considers the channel information as a to-be-compressed image (such as an image with a size of 28×28), uses a deep learning autoencoder to compress and feed back the channel information, and reconstructs the compressed channel image at the receiving end, which may retain the channel information to a greater extent.

Figure 7:
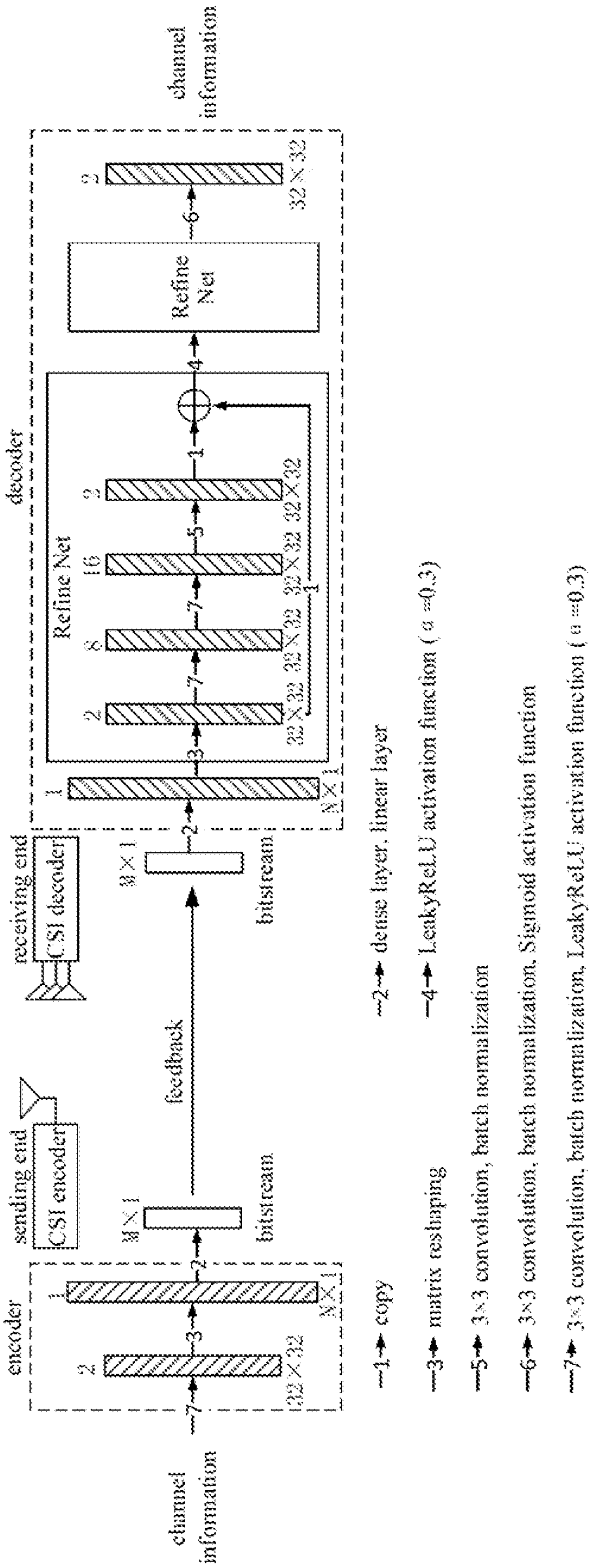
FIG. 7 is a schematic diagram of a deep learning-based channel information feedback system according to an embodiment of the disclosure.

A typical channel information feedback system is illustrated in FIG. 7. The whole feedback system is divided into an encoder part and a decoder part which are deployed at a sending end (UE) and a receiving end (network side) respectively. After obtaining the channel information through channel estimation, the sending end compresses and encodes a channel information matrix through the neural network of the encoder, and feeds back the compressed bitstream to the receiving end through an air interface feedback link, and the receiving end recovers the channel information through the decoder according to the feedback bitstream, to obtain complete feedback channel information. The encoder illustrated in FIG. 7 uses superposition of multiple full connected layers, and design of convolutional layers and residual structures is used in the decoder. In a case that the encoding and decoding framework remains unchanged, network model structures inside the encoder and the decoder may be flexibly designed.

In addition to the above manner of end-to-end based encoder and decoder to compress and recover the CSI in a single CSI feedback cycle, time-domain and frequency-domain correlations of the channel in multiple CSI feedback cycles may be used, to compress and feed back the CSI by using RNN type networks such as LSTM, GRU, etc.

(4) Transfer Learning

Figure 8:
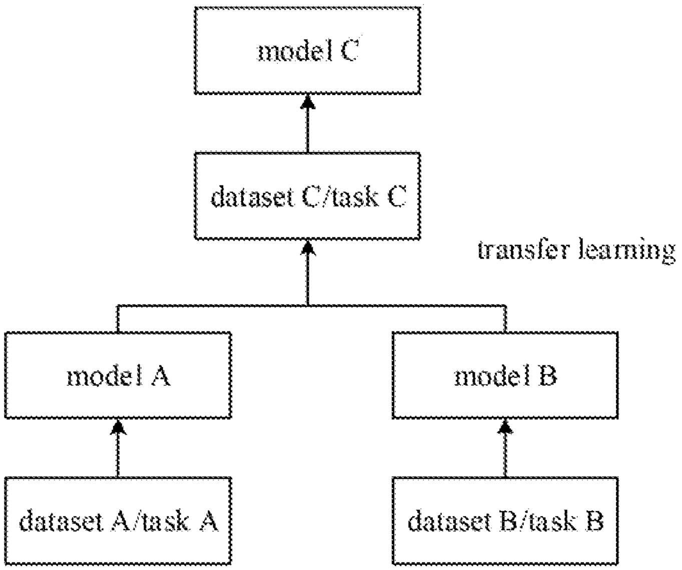
FIG. 8 is a schematic diagram of a transfer learning according to an embodiment of the disclosure.

Transfer learning is an important branch of machine learning, it may use similarity between data, tasks or models, and apply models and knowledge learned in an old domain to a new domain. FIG. 8 illustrates a simple transfer learning process. Taking different datasets and tasks as an example, a model A built for a dataset A/task A and a model B built for a dataset B/task B may be fused through some transfer manners, and then the model after transfer and fusion may be applied to a new dataset/task C, to complete application on the dataset/task C. The dataset A and the dataset B may be referred to as a source domain of transfer learning, and the dataset C may be referred to as a target domain of transfer learning. After obtaining an initial model through training on the source domain, transfer learning performs transfer training on the model of the source domain through methods such as sample selection, feature transfer, or model fine-tuning, or the like, so that the model is also applicable to the target domain, and then completes the task on the target domain.

Inventors of the disclosure found after in-depth research that on one hand, advantages of the codebook-based CSI feedback method in the NR system are that the method has better generalization performance and may adapt to different channel scenarios. However, since this solution performs quantization and feedback the channel according to a preset codebook vector, and the codebook itself cannot be adjusted according to real-time variation of environment of the channel, this solution introduces large errors in the feedback of the codebook obtained by the base station compared to an original CSI vector, and then CSI recovery accuracy is limited. On the other hand, deep learning-based CSI feedback considers using an encoder network (Encoder) of an AI autoencoder at the sending end to compress the CSI, and using a decoder network (Decoder) of the autoencoder at the receiving end to reconstruct the CSI. This solution uses non-linear fitting ability of the neural network to compress and feed back on the CSI, which may greatly improve compression efficiency and feedback accuracy. However, since complex environment of the channel may vary, channels of different cells also have different potential characteristics. Furthermore, generalization problem of the neural network itself in actual applications causes the trained network to be applicable to only a test set with the same characteristics as channel data of the training dataset, however, it is usually difficult for the training dataset to cover all situations. When characteristics of the scenario change, it is difficult for the trained model to continue to keep good generalization performance. Furthermore, when the user's channel changes, large performance fading of the deep learning-based CSI autoencoder may occur on individual slots or individual sub-bands, and its stability is not good enough compared to the codebook feedback solution.

The solutions provided in the embodiments of the disclosure are mainly intended to solve at least one of the above problems.

In order to understand characteristics and technical contents of the embodiments of the disclosure more thoroughly, implementations of the embodiments of the disclosure will be described in detail below with reference to the drawings. The drawings are only used for reference and description, and are not intended to limit the embodiments of the disclosure.

Figure 9:
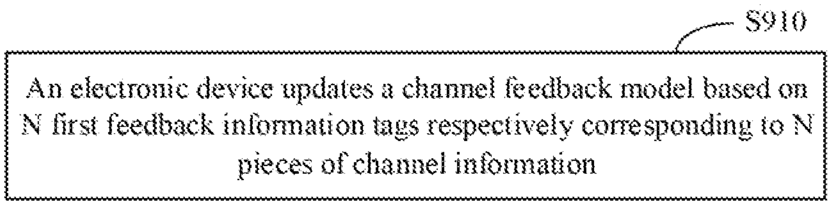
FIG. 9 is a schematic flowchart of a method for processing model according to an embodiment of the disclosure.

FIG. 9 is a schematic flowchart of a method for processing model according to an embodiment of the disclosure. Optionally, the method may be applied to the system illustrated in FIG. 1, but is not limited thereto. The method includes at least a part of the following contents.

At S910, an electronic device updates a channel feedback model based on N first feedback information tags respectively corresponding to N pieces of channel information.

The N first feedback information tags include N pieces of codebook output information obtained respectively quantizing, based on a codebook, the N pieces of channel information; the channel feedback model is used to obtain corresponding feedback information based on channel information which needs to be feedback, and N is an integer greater than or equal to 1.

Exemplarily, the electronic device may include an application server, a network device such as an access network device or a core network entity, a terminal device, etc.

Optionally, in the embodiment of the disclosure, the channel feedback model may be a deep learning model. Update of the deep learning model may be made based on tags and output information of the model. Exemplarily, the operation that electronic device updates the channel feedback model based on the N first feedback information tags respectively corresponding to the N pieces of channel information, may include that: the electronic device updates the channel feedback model based on the N first feedback information tags and N pieces of feedback information respectively corresponding to the N pieces of channel information. The N pieces of feedback information are obtained by respectively processing the N pieces of channel information by using the channel feedback model. That is, the electronic device updates the model based on the first feedback information tag of the channel information and the feedback information output by the model with respect to the channel information. For example, a loss function may be calculated based on the first feedback information tag and the feedback information output by the model, and the model may be updated based on the loss function.

Exemplarily, the channel feedback model may be a deep learning-based autoencoder, the autoencoder includes an encoder and a decoder, the encoder is configured to obtain compact encoding of the channel information, the compact encoding may be a bitstream, and the decoder is configured to recover the channel information based on the compact encoding.

During application of the channel feedback model, the encoder may be deployed on the terminal device, and the decoder may be deployed on the network device. The terminal device performs encoding for the channel information which needs to be feedback based on the encoder to obtain a corresponding bitstream, and sends the bitstream to the network device. The network device performs decoding for the bitstream based on the decoder to obtain corresponding feedback information which is used to characterize a channel state. That is, the channel feedback model includes an encoder and a decoder, the encoder is used by the terminal device to perform encoding based on the channel information which needs to be feedback to obtain a corresponding bitstream, and the decoder is used by the network device to perform decoding based on the bitstream to obtain corresponding feedback information.

Exemplarily, in the embodiment of the disclosure, the channel information may include Channel State Information (CSI). The feedback information corresponding to the channel information may be used to indicate the channel information to feed back the channel state.

It should be noted that the above N pieces of channel information may be channel information in a training dataset or a sample dataset of the channel feedback model. The channel feedback tag is feedback information labeled for the channel information in the training dataset before the model is updated.

In the embodiment of the disclosure, the first feedback information tag corresponding to the channel information includes the codebook output information obtained by quantizing, based on the codebook, the channel information. That is, the channel information may be quantized based on the codebook, to obtain the codebook output information such as a quantized codebook vector, and the codebook output information is labeled as the feedback information corresponding to the channel information. Performance of the model may be measured based on the labeled feedback information and the feedback information output by the model, thereby updating the model.

Optionally, the above operation that the channel feedback model is updated may include that: after determining a network structure of the channel feedback model, parameters in the network are updated. This operation may be implemented in a training process of the channel feedback model, the training process includes, but is not limited to a process of training the channel feedback model to convergence, a process of pre-training the channel feedback model to obtain a pre-training model, a process of using the channel feedback model as a pre-training model and performing transfer learning on the pre-training model, an online update process after applying the model, etc.

Optionally, the above codebook may include the Type 1 codebook and the Type 2 codebook in NR, or other codebooks with higher performance.

In the method of the embodiment of the disclosure, the codebook output information obtained based on the codebook and channel information is used as the feedback information tag, to update the channel feedback model. Since a tag information-based deep learning training mode is used, the channel feedback model may accurately obtain corresponding feedback information based on to-be-predicted channel information. Furthermore, since output of the codebook is introduced into training links of the model, output of the model may have advantages of the output of the codebook, which is applicable to various communication scenarios while has good CSI recovery accuracy, generalization and stability. That is, in the method of the embodiment of the disclosure, generalization and stability of a model with good CSI compression and feedback performance are considered while the model is trained, and the codebook is introduced as a training tag, thereby combining advantages of deep learning and traditional codebook-based CSI Feedback solutions.

Several exemplary implementations of the above method for processing model are provided below.

First Example

In the example, the operation S910 that the electronic device updates the channel feedback model based on the N first feedback information tags respectively corresponding to the N pieces of channel information, includes the following operations.

The electronic device obtains N second feedback information tags respectively corresponding to the N pieces of channel information based on the N pieces of channel information.

The electronic device updates the channel feedback model based on N pieces of feedback information respectively corresponding to the N pieces of channel information, the N first feedback information tags respectively corresponding to the N pieces of channel information, and the N second feedback information tags respectively corresponding to the N pieces of channel information. The N pieces of feedback information are obtained by respectively processing the N pieces of channel information by using the channel feedback model.

Optionally, the electronic device may obtain corresponding second feedback information tag by processing the channel information. For example, the electronic device converts the channel information based on a predetermined algorithm, to obtain the second feedback information tag. For another example, the electronic device quantizes the channel information based on a first codebook to obtain the first feedback information tag, and quantizes the channel information based on a second codebook to obtain the second feedback tag.

Optionally, the electronic device may also directly use the channel information as the second feedback information tag. That is, during update of the channel feedback model, the channel information in the training dataset has two feedback information tags, including the channel information itself and corresponding codebook output information. Since the channel information is used as the second feedback information tag and the codebook output information corresponding to the channel information is used as the first feedback information tag, the feedback information output by the updated model with respect to the channel information may tend to have features similar to the channel information and tend to have features similar to the codebook output information, thereby having higher CSI recovery accuracy, stability and generalization.

Optionally, the operation that the electronic device updates the channel feedback model based on the N pieces of feedback information respectively corresponding to the N pieces of channel information, the N first feedback information tags respectively corresponding to the N pieces of channel information, and the N second feedback information tags respectively corresponding to the N pieces of channel information includes the following operations.

The electronic device processes an i-th piece of channel information of the N pieces of channel information by using the channel feedback model, to obtain feedback information corresponding to the i-th piece of channel information, i is a positive integer less than or equal to N.

The electronic device determines a first loss function corresponding to the i-th piece of channel information based on the feedback information and a first feedback information tag corresponding to the i-th piece of channel information.

The electronic device determines a second loss function corresponding to the i-th piece of channel information based on the feedback information and a second feedback information tag corresponding to the i-th piece of channel information, the first loss function and the second loss function are used to update the channel feedback model.

The i-th piece of channel information may be any one or a specific one piece of the N pieces of channel information; or, the i-th piece of channel information may represent each of the N pieces of channel information, that is, the above operations are performed on each channel information in the training dataset.

It may be seen that in the above optional manner, with regard to a specific channel information, feedback information output by the model with respect to the channel information is obtained first, and then loss functions are respectively calculated based on output of the model and two feedback information tags. The calculated loss functions will be used to update the channel feedback model.

Optionally, the above first loss function or the above second loss function may include Mean Square Error (MSE), cosine similarity, etc. During specific implementation, a joint loss function may be calculated based on two loss functions of certain channel information, and then the model may be updated based on the joint loss function. Or, multiple pieces of channel information may be processed in batch, for example, a joint loss function is calculated based on multiple sets of loss functions corresponding to multiple pieces of channel information, and then the model is updated based on the joint loss function.

Optionally, the first loss function and the second loss function use the same calculation mode, for example, the first loss function and the second loss function both uses MSE or both uses cosine similarity.

Optionally, the operation that the channel feedback model is updated based on the N pieces of channel information, the N first feedback information tags and the N second feedback information tags further includes the following operations.

A third loss function is determined based on X first loss functions respectively corresponding to X pieces of channel information, Y first loss functions respectively corresponding to Y pieces of channel information, and a preset weight; each of X and Y is a positive integer less than or equal to N.

The channel feedback model is updated based on the third loss function.

Optionally, X may be equal to Y. Further, the above X pieces of channel information may be the same as the above Y pieces of channel information, or may have an intersection with the above Y pieces of channel information, or may be completely different from the above Y pieces of channel information.

Optionally, the preset weight may include a weight of the first loss function and/or a weight of the second loss function.

Figure 10:
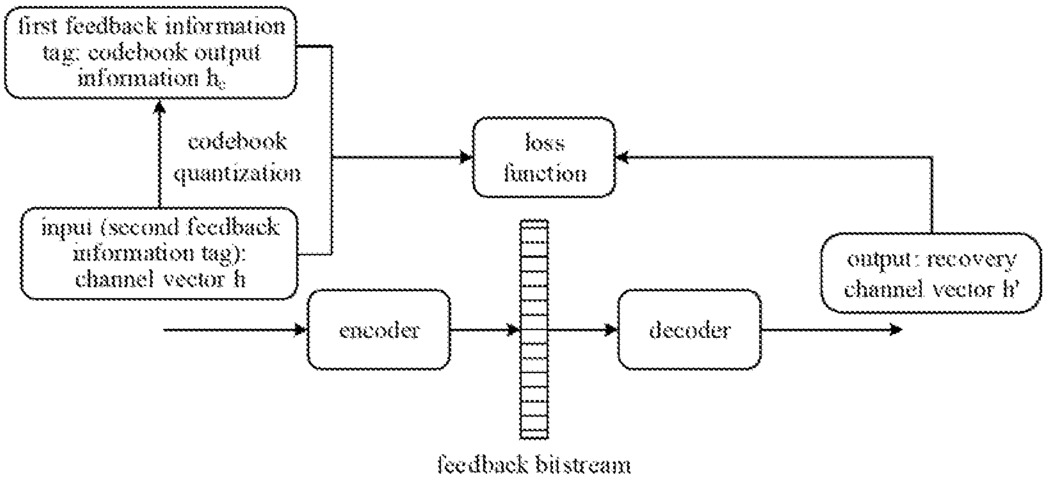
FIG. 10 is a schematic diagram of a training process of a channel feedback model according to another embodiment of the disclosure.

Taking the channel feedback model being an autoencoder (denoted as a CSI autoencoder) and the channel information being a vector (denoted as a channel vector h) as an example, as illustrated in FIG. 10, in a process of training the CSI autoencoder, input of the CSI autoencoder is the channel vector h which has a second feedback information tag (main tag) correspondingly, the second feedback information tag is the channel vector h itself, and it is proposed in the example that codebook output information $h_c$ obtained by codebook quantizing the channel vector h is used as a first feedback information tag (auxiliary tag) to train the autoencoder.

A specific training process includes the following operations.

At operation 1, a training dataset including N channel vectors h (used as the input of the CSI autoencoder and the second feedback information tag) and corresponding codebook output information $h_c$ (used as the first feedback information tag) is obtained. The codebook used to obtain the codebook output information $h_c$ may use the Type 1 codebook and the Type 2 codebook in NR, or a codebook with higher performance; the CSI autoencoder may use various forms of neural networks such as DNN, CNN, LSTM or the like, which is not limited here.

At operation 2, a joint loss function is set. A manner of calculating the joint loss function may refer to the following formula:

$$L(h', h, h_c) = L_1(h', h) + \lambda L_2(h', h_c)$$

L is the joint loss function. $L_1$ is a loss function used to evaluate a difference between feedback information output by the model and the second feedback information tag (the channel vector h). $L_2$ is a loss function used to evaluate a difference between the feedback information and the first feedback information tag (the codebook output information $h_c$). The feedback information is information obtained by processing the channel vector h by the model, that is, output information of the model, and the feedback information may be a vector (denoted as a recovery channel vector h'). Each of the loss function L1 and the loss function L2 may use a loss function such as MSE, cosine similarity or the like, which is not limited here. $\lambda$ is a weight for a weighted sum of the two loss functions. When $\lambda$ is small, the first feedback information tag has a small influence on guidance of the model, and the model tends to a traditional CSI autoencoder with a target of recovering the channel vector h in a current scenario on the training dataset to the greatest extent. When $\lambda$ is large, the first feedback information tag has a great influence on guidance of the model, and the model tends to further consider generalization performance of the codebook. Therefore, selecting an appropriate $\lambda$ can enable the network to consider recovery accuracy, stability and generalization simultaneously.

At operation 3, the model is trained based on the training dataset and the set manner of calculating the joint loss function, and a converged channel feedback model is obtained after a certain number of training rounds.

After training of the model finishes, the encoder and the decoder of the model may be deployed at the terminal side and the network side respectively, to be used for online compression and feedback of the CSI.

Second Example

Figure 11:
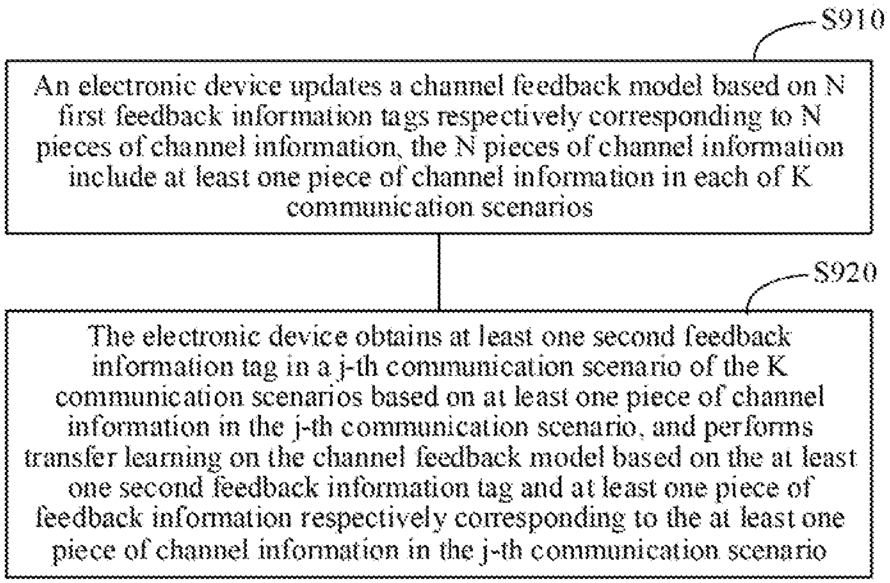
FIG. 11 is a schematic flowchart of a method for processing model according to yet another embodiment of the disclosure.

In the example, as illustrated in FIG. 11, a method for processing model includes the following operation S910 for pre-training and the following operation S920 for transfer learning.

At S910, an electronic device updates a channel feedback model based on N first feedback information tags respectively corresponding to N pieces of channel information, the N pieces of channel information include at least one piece of channel information in each of K communication scenarios.

K is an integer greater than or equal to 1, the N first feedback information tags include N pieces of codebook output information obtained by respectively quantizing, based on a codebook, the N pieces of channel information.

At S920, the electronic device obtains at least one second feedback information tag in a j-th communication scenario of the K communication scenarios based on at least one piece of channel information in the j-th communication scenario, and performs transfer learning on the channel feedback model based on the at least one second feedback information tag and at least one piece of feedback information respectively corresponding to the at least one piece of channel information in the j-th communication scenario.

j is a positive integer less than or equal to K, the at least one piece of feedback information is obtained by respectively processing the at least one piece of channel information by using the channel feedback model, the channel feedback model after transfer learning is used to obtain corresponding feedback information based on channel information which needs to be feedback in the j-th communication scenario.

Exemplarily, the j-th communication scenario is a communication scenario to be transferred and adapted. It may be seen that a method for obtaining and transferring a codebook-guided-based channel feedback pre-training model is given in the example. First, the model is updated through the channel information in the K communication scenarios and the first feedback information tag obtained based on the codebook, to obtain a pre-training model with good generalization ability. Then, rapid transfer and adaptation in a specific communication scenario is achieved based on the channel information in the communication scenario.

Optionally, the pre-training model may be pre-configured or configured by default. Exemplarily, the network device or the application server pre-configures and stores the pre-training model. In an actual application (for example, when switching or adding communication scenario, or when the model is updated online after deploying model), transfer learning is performed on the pre-training model based on the channel information in a specific communication scenario, to achieve rapid transfer and adaptation without obtaining the pre-training model through additional training.

Optionally, in the embodiment of the disclosure, the communication scenario may be a scenario determined based on a communication environment and/or one or more communication index parameters. For example, the K communication scenarios may be K different cities and regions, or K different bands.

Optionally, in the example, the operation S910 that the electronic device updates the channel feedback model based on the N first feedback information tags respectively corresponding to the N pieces of channel information, includes the following operations.

The electronic device processes an i-th piece of channel information of the N pieces of channel information based on the channel feedback model, to obtain feedback information corresponding to the i-th piece of channel information, i is a positive integer less than or equal to N.

The electronic device determines a first loss function corresponding to the i-th piece of channel information based on the feedback information and a first feedback information tag corresponding to the i-th piece of channel information, the first loss function is used to update the channel feedback model. Specifically, during each update, the update may be performed based on a first loss function corresponding to single channel information, or the update may be performed based on multiple first loss functions corresponding to multiple pieces of channel information.

Optionally, in S920 of the example, the electronic device obtains a corresponding second feedback information tag based on the channel information in the j-th communication scenario, which may mean that the electronic device obtains the corresponding second feedback information tag by converting the channel information in the j-th communication scenario, or may mean that the electronic device uses the channel information in the j-th communication scenario as the corresponding second feedback information tag. The electronic device performs transfer learning on the channel feedback model based on the second feedback information tag and the channel information in the j-th communication scenario, which may mean that the electronic device processes the channel information in the j-th communication scenario by using the channel feedback model to obtain the feedback information, calculates a loss function based on the feedback information and the second feedback information tag, and then performs transfer updating on the channel feedback model based on the loss function.

Optionally, the channel feedback model may include M network layers. In S920, the operation that transfer learning is performed on the channel feedback model may include the following operations. Parameters of L network layers in the channel feedback model are updated, M is an integer greater than or equal to 1, and L is an integer less than or equal to M.

That is, during transfer learning, the channel information itself is used as a feedback information tag. Based on the tag, parameters of all network layers of the model may be updated, or parameters of only a part of the network layers may be updated, so that transfer learning speed of the model and CSI recovery accuracy are further considered according to actual requirements.

Optionally, the L network layers are last L network layers of the M network layers. Specifically, the L network layers may be last L network layers of the decoder in the model. Considering that a front-placed layer of the decoder of the pre-training model extracts general features, and a back-placed layer of the decoder of the pre-training model extracts high-order features, therefore during transfer, it may consider to transfer only the back-placed layer, while parameters of the front-placed layer are fixed and unchanged, thereby accelerating the transfer training speed of the model.

A specific implementation process is given below:

First, a method for building a training dataset used to obtain the pre-training model of the CSI autoencoder is given in the example. The example considers K communication scenarios, labeled 1≤ k≤K respectively. A dataset of a k-th communication scenario contains $N_k$ samples. There are $$N_k^1$$

samples containing the first feedback information tag (auxiliary tag, that is, the codebook output information), and there are $$N_k^2$$

samples without containing the first feedback information tag, so that $$N_k = N_k^1 + N_k^2.$$

The training dataset used by the pre-training model is a joint dataset which is obtained based on datasets containing the first feedback information tag in all the K communication scenarios, and size $N^1$ of the dataset refers to the following formula:

$$N^1 = \sum_{k=1}^{K} N_k^1$$

On the joint dataset containing the first feedback information tag, considering that the codebook is applicable to various scenarios, a network output by fitting the codebook may have good generalization and is suitable to be used as a to-be-transferred pre-training model. Therefore, the method for obtaining the pre-training model of the CSI autoencoder may be implemented with reference to FIG. 12.

Figure 12:
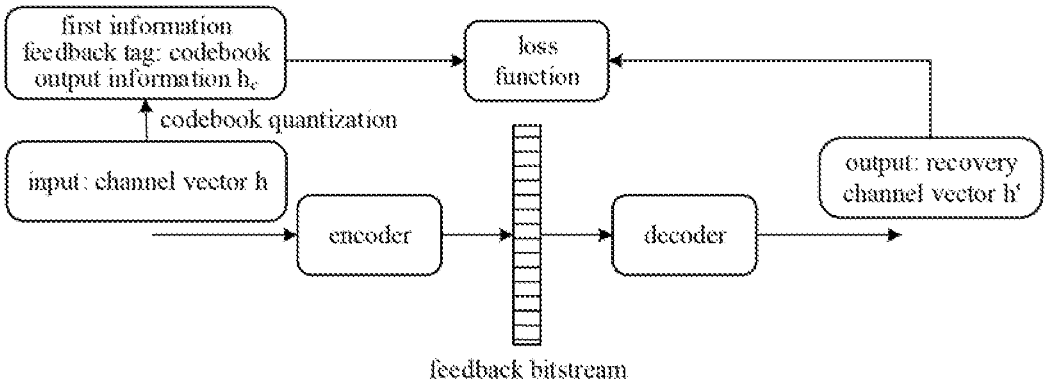
FIG. 12 is a schematic diagram of a pre-training process of a channel feedback model according to yet another embodiment of the disclosure

As illustrated in FIG. 12, the channel information is a vector, that is, a channel vector h, the channel vector h itself is only used as input of the model and is not used as a tag to participate in training. A tag of the channel vector h is the first feedback information tag, specifically, the codebook output information $h_c$. The channel vector h is processed by using the model to obtain feedback information, and the feedback information may be a vector (denoted as a recovery channel vector h'). A loss function is calculated based on the tag and the recovery channel vector h' output by the model, and the model is updated according to the loss function. The updated model is a pre-training model, so that the pre-training model may fit mapping from the channel vector h to the codebook output information $h_c$, and this mapping method is applicable to the entire K-type communication scenarios, which is a general feature with generalization in the CSI compression and recovery, and does not fit features with scenario characteristics in recovery of the channel vector h. Optionally, the loss function in the training process may use evaluation indicators such as MSE, cosine similarity, etc. The encoder and decoder may also use structures such as DNN, CNN, LSTM or the like, which is not limited in the example.

After obtaining the pre-training model, faster transfer may be achieved in different scenarios, and adaptation may be achieved with less training time and computing cost. Specifically, with respect to the k-th type of scenario, $$N_k^2$$

samples from a sample group without containing the first feedback information tag achieve fine-tuning of the model.

Figure 13:
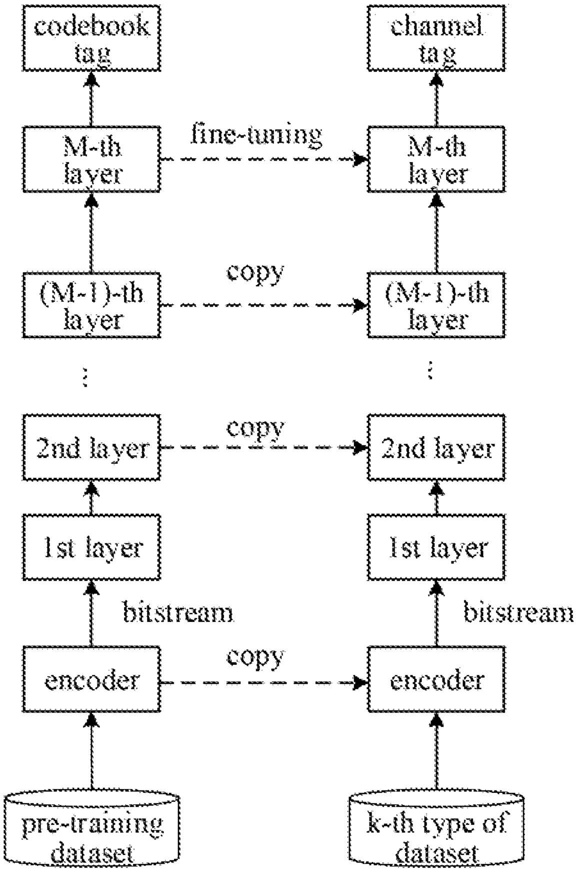
FIG. 13 is a schematic diagram of a transfer learning process of a channel feedback model according to yet another embodiment of the disclosure.

Taking a DNN or CNN decoder containing M layers as an example, as illustrated in FIG. 13, considering that a front-placed layer of the decoder of the pre-training model extracts general features, and a back-placed layer of the decoder of the pre-training model extracts high-order features, therefore during transfer, it may consider to transfer only the back-placed layer of the decoder, while parameters of the front-placed layer are fixed and unchanged, thereby accelerating the transfer training speed of the model. FIG. 13 gives an illustration of transferring only the last layer of the decoder (a full connected layer or a convolutional layer), however, the embodiment of the disclosure is not limited to the implementation of transferring only the last layer of the decoder, and may also perform transfer training on other numbers of network layers.

Third Example

During online deployment, the network may not be able to adapt to rapid variation of the channel, therefore certain online updates of the model are required. With regard to online update of the CSI autoencoder, considering that the encoder is deployed at the terminal side, the decoder is deployed at the network side, and varied CSI estimated by the terminal side according to CSI-RS is unknown at the network side, therefore transfer learning with channel vector tags cannot be implemented at the network side; furthermore, considering limited computing power at the terminal side, it is still desired to implement online update of the model at the network side, therefore an online update solution of the CSI decoder based on guidance of the codebook is proposed in the example.

Specifically, in the example, the electronic device updating the channel feedback model is a network device. Before the foregoing S910, the method for processing model further includes the following operations.

The network device receives, from a terminal device, N pieces of codebook output information and N bitstreams respectively corresponding to N pieces of channel information, the N bitstreams are obtained by the terminal device respectively processing the N pieces of channel information by using an encoder in the channel feedback model.

Correspondingly, in S910, the operation that the electronic device updates the channel feedback model based on the N first feedback information tags respectively corresponding to the N pieces of channel information, includes the following operations.

The network device obtains the N first feedback information tags based on the N pieces of codebook output information, and updates a decoder in the channel feedback model based on the N bitstreams and the N first feedback information tags.

Exemplarily, the network device may update the decoder in the channel feedback model based on N first feedback tags and feedback information respectively output by the channel feedback model with respect to the N bitstreams. In an actual application, a loss function may be calculated based on the feedback information and the first feedback tag, and the decoder may be updated based on the loss function.

That is, a method for processing model, performed by a network device, is given in the example, and mainly includes an operation of updating a decoder in a channel feedback model, and includes the following operations.

The network device receives, from a terminal device, N pieces of codebook output information and N bitstreams respectively corresponding to N pieces of channel information, the N bitstreams are obtained by the terminal device respectively processing the N pieces of channel information by using an encoder in a channel feedback model, the N pieces of codebook output information are obtained by the terminal device respectively quantizing, based on a codebook, the N pieces of channel information.

The network device obtains N first feedback information tags based on the N pieces of codebook output information, and updates a decoder in the channel feedback model based on the N bitstreams and the N first feedback information tags, the decoder is configured to perform decoding based on a to-be-decoded bitstream received from the terminal device, to obtain corresponding feedback information.

Correspondingly, a method for processing model, performed by a terminal device, is given in the example, and mainly includes an operation of sending a coded bitstream and codebook output information corresponding to channel information to a network, so that the network may update the decoder. Specifically, the method includes the following operations.

The terminal device respectively processes N pieces of channel information by using an encoder in a channel feedback model to obtain N bitstreams; and quantizes the N pieces of channel information based on a codebook respectively to obtain N pieces of codebook output information.

The terminal device sends the N bitstreams and the N pieces of codebook output information to a network device, the N pieces of codebook output information are used to obtain N first feedback information tags; the N bitstreams and the N first feedback information tags are used by the network device to update a decoder in the channel feedback model, the decoder is configured to perform decoding based on a to-be-decoded bitstream of the terminal device, to obtain corresponding feedback information.

Exemplarily, variation of environment of the channel may be monitored by the network device or the terminal device, to determine whether update of the model is required. It may also be that the network device or the terminal device triggers update of the model based on a specific instruction such as an instruction input by the user. Optionally, when update of the model is required, a party triggering the update sends indication information to notify another party to update the model. Specifically, with regard to the network device, the operation of the network device receives, from the terminal device, the N pieces of codebook output information and the N bitstreams corresponding to the N pieces of channel information includes the following operations.

In case of sending first indication information to the terminal device and/or receiving second indication information from the terminal device, the network device receives, from the terminal device, the N pieces of codebook output information and the N bitstreams respectively corresponding to the N pieces of channel information.

Correspondingly, with regard to the terminal device, the operation that the terminal device sends the N bitstreams and the N pieces of codebook output information to the network device includes the following operations.

In case of receiving first indication information from the network device and/or sending second indication information to the network device, the terminal device sends the N bitstreams and the N pieces of codebook output information to the network device.

Figure 14:
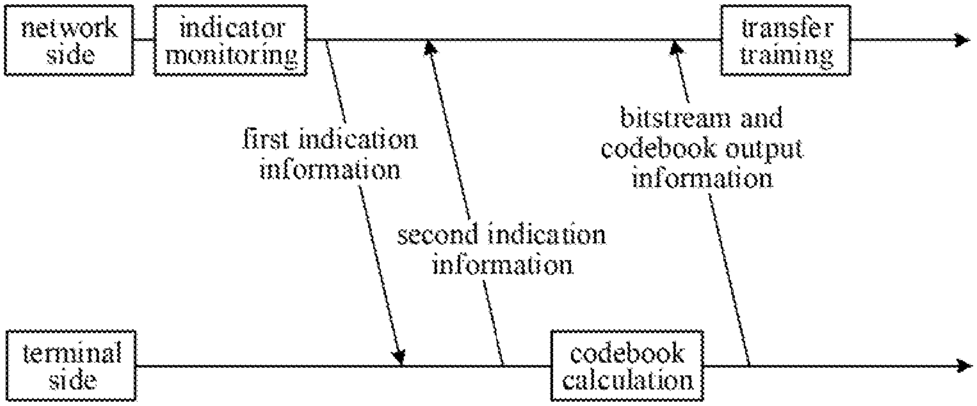
FIG. 14 is a schematic diagram of a first indication manner of a network device and a terminal device in an embodiment of the disclosure.

In some application scenarios, the bitstream and codebook output information may be transmitted after the network device sends the first indication information to the terminal device or the terminal device sends the second indication information to the network device. In some other application scenarios, the network device and the terminal device may send indication information to each other, and the network device and the terminal device confirm starting update of the model, and then the bitstream and codebook output information are transmitted. For example, as illustrated in FIG. 14, the network device sends the first indication information to the terminal device, the terminal device sends the second indication information to the network device in response to the first indication information, and then the bitstream and codebook output information are transmitted. It may be understood that there may also be a case where the terminal device sends the second indication information to the network device, the network device sends the first indication information to the terminal device in response to the second indication information, and then the bitstream and codebook output information are transmitted.

As an example, various indication information in the embodiment of the disclosure may be Downlink Control Information (DCI) or Uplink Control Information (UCI), or may be indication information dedicated to AI functions. For example, the first indication information may be DCI. The second indication information may be UCI. For another example, the first indication information and/or the second indication information may be indication information dedicated to AI.

In the embodiment of the disclosure, the first indication information and/or the second indication information is used to indicate update of the channel feedback model. Exemplarily, the first indication information and/or the second indication information may include a model update indication.

Optionally, the terminal device may autonomously determine the number N of the codebook output information and the reported bitstream. Or, the terminal device may report codebook output information and bitstreams corresponding to channel information with a specified number or specified parameters according to configuration of the network.

Optionally, the first indication information is further used to indicate parameters of a training dataset which are used to determine N. Here, since the training dataset is used for online update of the model and has a small volume of data, the training dataset may also be referred to as a small sample dataset.

Figure 15:
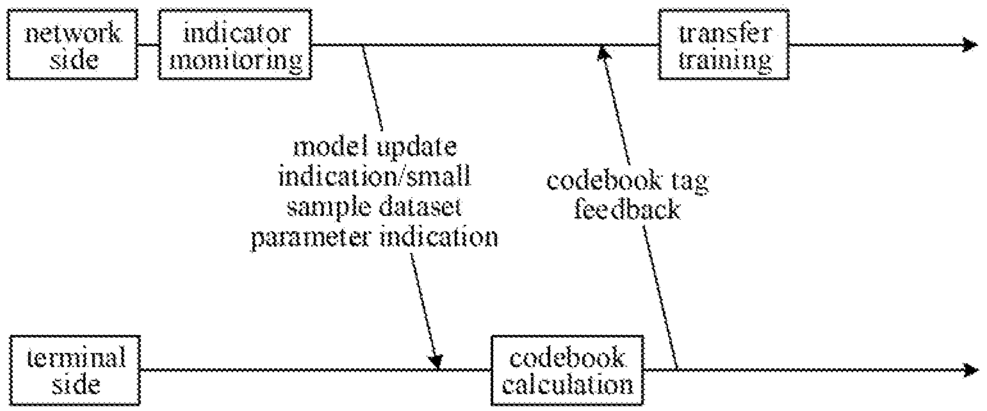
FIG. 15 is a schematic diagram of a second indication manner of a network device and a terminal device in an embodiment of the disclosure.

That is, the network device may carry the model update indication and small sample dataset parameter indication in the first indication information. As illustrated in FIG. 15, after the network side sends the first indication information carrying the model update indication and small sample dataset parameter indication to the terminal side, the terminal side performs codebook calculation to obtain codebook output information. Since the codebook output information is used as the feedback information tag, the codebook output information may be denoted as a codebook tag. The terminal side feeds back the codebook tag to the network side, and the network side performs transfer training of the decoder based on the codebook tag and the corresponding bitstream.

Optionally, after the terminal device sends the second indication information to the network device to trigger online update of the model, the network device may send third indication information to the terminal device, to indicate parameters of the training dataset. That is, the method further includes the following operations.

The network device sends third indication information to the terminal device; and/or, the terminal device receives third indication information from the network device. The third indication information is used to indicate parameters of a training dataset which are used to determine N.

Figure 16:
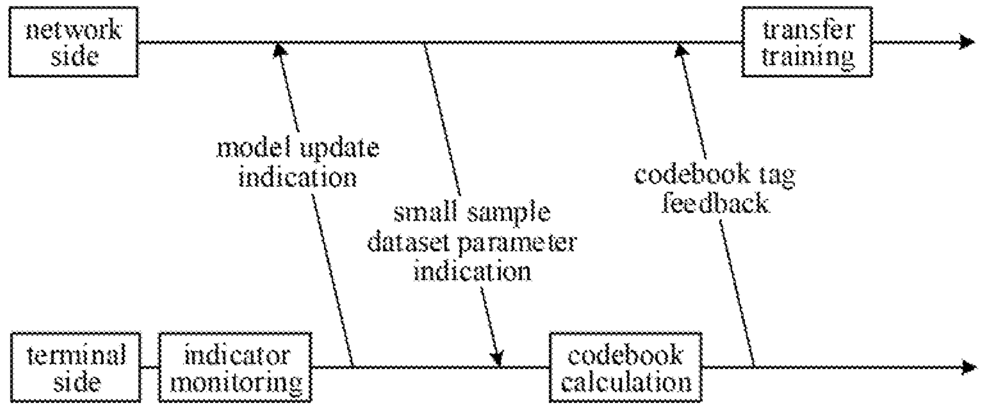
FIG. 16 is a schematic diagram of a third indication manner of a network device and a terminal device in an embodiment of the disclosure.

As illustrated in FIG. 16, the terminal side monitors variation of environment of the channel, and sends the model update indication to the network side when update of the model is required. After receiving the model update indication, the network side sends the small sample dataset parameter indication to the terminal side. The terminal side determines a volume of data in the small sample dataset based on the indication, performs codebook calculation based on the volume of data, and feeds back the codebook tag to the network side, and the network side performs transfer training of the decoder based on the codebook tag and the corresponding bitstream.

Exemplarily, the parameters of the training dataset include the number T of slots and/or the number P of bands. The above method further includes the following operations. The terminal device determines, based on the parameters of the training dataset, to send the N pieces of codebook output information and the N bitstreams to the network device based on N pieces of channel information on T slots and/or P bands.

For example, channel-related information on how many bands which are required to report by the terminal device on each slot, may be pre-configured or configured by default. When update of the model is required, the network device indicates the slot number T to the terminal device; and the terminal device may determine, based on T, the number of information required to be reported. For another example, channel-related information on how many slots which are required to report by the terminal device, may be pre-configured or configured by default. When update of the model is required, the network device indicates the band number P to the terminal device; and the terminal device may determine, based on P, the number of information required to be reported. For another example, the network device indicates the slot number T and the band number P to the terminal device, and the terminal device may determine that a total of T×P groups of related information of P bands on T slots need to be reported.

Optionally, the network device does not need to indicate the parameters of the training dataset. The terminal device may report periodically, to report codebook output information and bitstream(s) corresponding to one or more pieces of channel information each time. That is, the operation that the network device receives, from the terminal device, the N pieces of codebook output information and the N bitstreams respectively corresponding to the N pieces of channel information includes the following operations. The network device periodically receives from the terminal device codebook output information and the bitstream corresponding to the channel information. The operation that the terminal device sends the N bitstreams and the N pieces of codebook output information to the network device includes the following operations. The terminal device periodically sends codebook output information and the bitstream corresponding to the channel information to the network device.

Optionally, indication information may be sent by the network device, to close codebook reporting. Specifically, the model updating method further includes the following operations. The network device sends fourth indication information to the terminal device; and/or, the terminal device stops sending the codebook output information and bitstream(s) corresponding to the channel information after receiving fourth indication information from the network device. The fourth indication information is used to indicate the terminal device to stop sending the codebook output information and bitstream(s) corresponding to the channel information, that is, the fourth indication information is an indication of closing codebook reporting.

Figure 17:
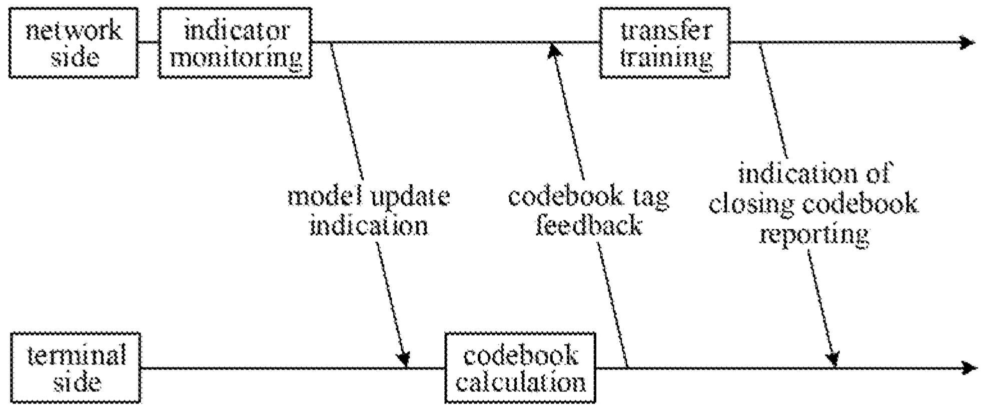
FIG. 17 is a schematic diagram of a fourth indication manner of a network device and a terminal device in an embodiment of the disclosure.
Figure 18:
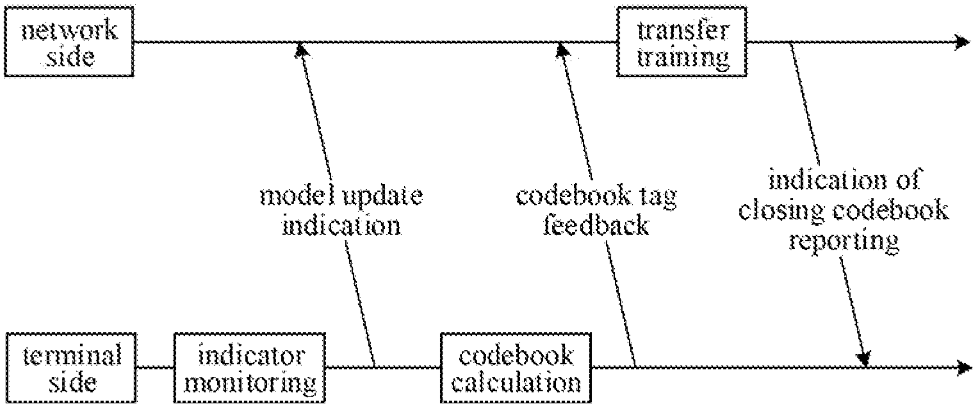
FIG. 18 is a schematic diagram of a fifth indication manner of a network device and a terminal device in an embodiment of the disclosure.

As illustrated in FIG. 17, whether update is required, may be monitored by the network side. After the network side sends the model update indication, the terminal side periodically feed backs the codebook tag until the network side sends the indication of closing codebook reporting. As illustrated in FIG. 18, whether update is required, may be monitored by the terminal side. After the terminal side sends the model update indication, the terminal side periodically feed backs the codebook tag until the network side sends the indication of closing codebook reporting.

A specific update manner of the model can refer to the following specific application process example, which includes the following operation 1 to operation 4.

At operation 1, the network or the terminal monitors variation of environment of the channel. When update of the model is required, the network issues a model update indication to the terminal through DCI, or the terminal reports a model update indication to the network through UCI.

At operation 2, the terminal feeds back a bitstream b compressed by the encoder in the CSI autoencoder to the network, while reports corresponding codebook quantization feedback, and the network side recovers the codebook output information $h_c$ based on the codebook quantization feedback. The reporting process may include the codebook output information $h_c$ and bitstream b corresponding to channel information in T slots and P bands, to form a small sample dataset required for transfer training. Parameters of the small sample dataset, such as T and/or P, may be directly configured by the network through DCI, or may be configured by the terminal using a continuous and periodic reporting mode.

Figure 19:
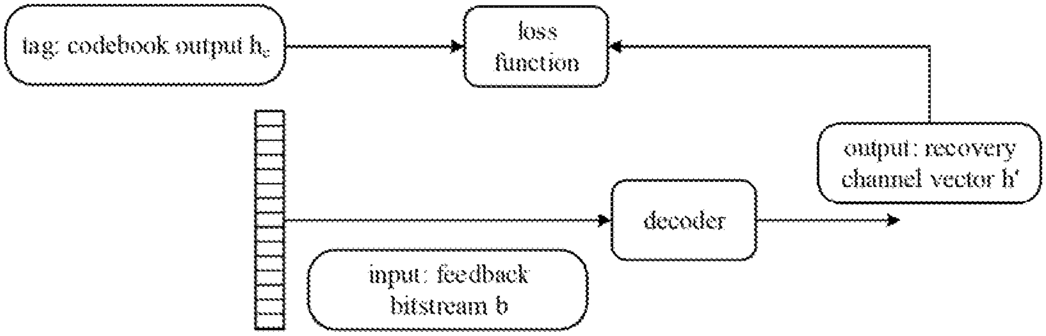
FIG. 19 is a schematic diagram of an online update process of a channel feedback model according to yet another embodiment of the disclosure.

At operation 3, the network side performs transfer training on the decoder based on the small sample dataset, as illustrated in FIG. 19.

During the transfer training, only the decoder is updated, and the encoder at the terminal side remains unchanged.

Therefore, the bitstream b fed back by the encoder may be used as input, and the bitstream b corresponds to a feedback information tag (the first feedback information tag) which is the codebook output information $h_c$. The decoder obtains feedback information by processing the bitstream b, and the feedback information may be a vector denoted as a recovery channel vector h'. The update process may include that a loss function is determined based on the tag (the codebook output information $h_c$) and the recovery channel vector h' output by the decoder, and then parameters of the network layer in the decoder are updated based on the loss function. The loss function may use evaluation indicators such as MSE, cosine similarity, etc. The decoder may also use different neural networks such as DNN, CNN, LSTM or the like, which is not limited in the embodiment of the disclosure.

At operation 4, if the terminal uses the continuous and periodic reporting mode, after the transfer training is finished, the network side may send the indication of closing codebook reporting to the terminal, to enter a normal operation state.

Specific configuration and implementation of the embodiments of the disclosure are described as above from different perspectives through multiple embodiments. With at least one of the above embodiments, the codebook output information obtained based on the codebook and channel information may be used as the feedback information tag, to update the channel feedback model. Since a tag information-based deep learning training manner is used, the channel feedback model may accurately obtain corresponding feedback information based on to-be-predicted channel information. Furthermore, since output of the codebook is introduced into training links of the model, output of the model may have advantages of the output of the codebook, which is applicable to various communication scenarios while has good CSI recovery accuracy, generalization and stability.

Figure 20:
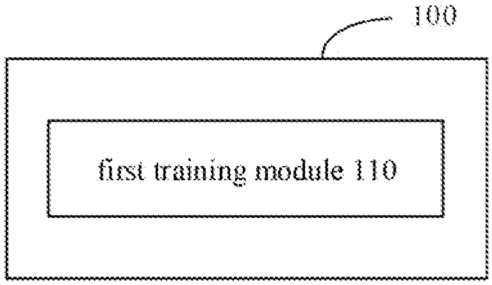
FIG. 20 is a schematic structural block diagram of an electronic device according to an embodiment of the disclosure.

Corresponding to the processing method in at least one of the above embodiments, an embodiment of the disclosure further provides an electronic device 100, with reference to FIG. 20, the electronic device 100 includes a first training module 110.

The first training module 110 is configured to update a channel feedback model based on N first feedback information tags respectively corresponding to N pieces of channel information.

The N first feedback information tags include N pieces of codebook output information obtained by respectively quantizing, based on a codebook, the N pieces of channel information; the channel feedback model is used to obtain corresponding feedback information based on channel information which needs to be feedback, and N is an integer greater than or equal to 1.

Optionally, the channel feedback model includes an encoder and a decoder.

The encoder is used by a terminal device to perform encoding based on the channel information which needs to be feedback, to obtain a corresponding bitstream.

The decoder is used by a network device to perform decoding based on the bitstream, to obtain corresponding feedback information.

Figure 21:
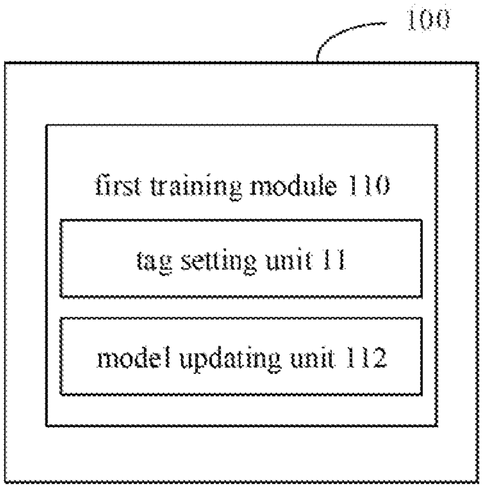
FIG. 21 is a schematic structural block diagram of an electronic device according to another embodiment of the disclosure.

Optionally, as illustrated in FIG. 21, the first training module 110 includes a tag setting unit 111 and a model updating unit 112.

The tag setting unit 111 is configured to obtain N second feedback information tags respectively corresponding to the N pieces of channel information based on the N pieces of channel information.

The model updating unit 112 is configured to update the channel feedback model based on N pieces of feedback information respectively corresponding to the N pieces of channel information, the N first feedback information tags respectively corresponding to the N pieces of channel information, and the N second feedback information tags respectively corresponding to the N pieces of channel information, the N pieces of feedback information are obtained by respectively processing the N pieces of channel information by using the channel feedback model.

Optionally, the model updating unit 111 is specifically configured to:

- process an i-th piece of channel information of the N pieces of channel information by using the channel feedback model, to obtain feedback information corresponding to the i-th piece of channel information, i is a positive integer less than or equal to N;
- determine a first loss function corresponding to the i-th piece of channel information based on the feedback information and a first feedback information tag corresponding to the i-th piece of channel information; and
- determine a second loss function corresponding to the i-th piece of channel information based on the feedback information and a second feedback information tag corresponding to the i-th piece of channel information, the first loss function and the second loss function are used to update the channel feedback model.

Optionally, the model updating unit 111 is further configured to:

- determine a third loss function based on X first loss functions respectively corresponding to X pieces of channel information, Y first loss functions respectively corresponding to Y pieces of channel information, and a preset weight; each of X and Y is a positive integer less than or equal to N; and
- update the channel feedback model based on the third loss function.

Optionally, the N pieces of channel information include at least one piece of channel information in each of K communication scenarios, K is an integer greater than or equal to 1.

Figure 22:
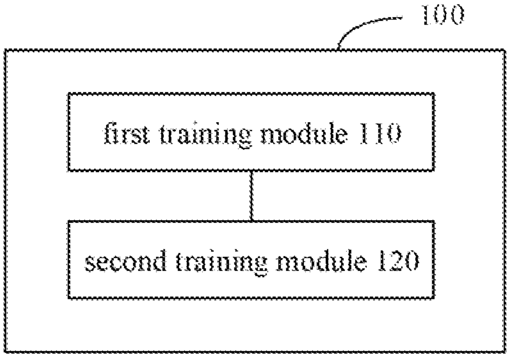
FIG. 22 is a schematic structural block diagram of an electronic device according to yet another embodiment of the disclosure.

As illustrated in FIG. 22, the electronic device further includes a second training module 120 configured to:

- obtain at least one second feedback information tag in a j-th communication scenario of the K communication scenarios based on at least one piece of channel information in the j-th communication scenario, j is a positive integer less than or equal to K; and
- perform transfer learning on the channel feedback model based on the at least one second feedback information tag and at least one piece of feedback information respectively corresponding to the at least one piece of channel information in the j-th communication scenario; the at least one piece of feedback information is obtained by respectively processing the at least one piece of channel information by using the channel feedback model, the channel feedback model after transfer learning is used to obtain corresponding feedback information based on channel information which needs to be feedback in the j-th communication scenario.

Optionally, the channel feedback model includes M network layers.

The second training module 120 is specifically configured to update parameters of L network layers in the channel feedback model, M is an integer greater than or equal to 1, and L is an integer less than or equal to M.

Optionally, the L network layers are last L network layers of the M network layers.

Figure 23:
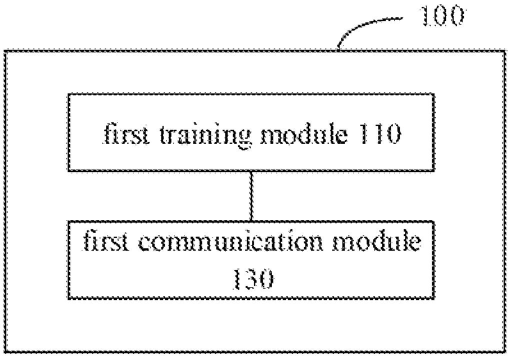
FIG. 23 is a schematic structural block diagram of an electronic device according to yet another embodiment of the disclosure.

Optionally, as illustrated in FIG. 23, the electronic device 100 is a network device, and the network device further includes a first communication module 130.

The first communication module 130 is configured to receive, from a terminal device, N pieces of codebook output information and N bitstreams respectively corresponding to N pieces of channel information; the N bitstreams are obtained by the terminal device respectively processing the N pieces of channel information by using an encoder in the channel feedback model.

Correspondingly, the first training module 110 is specifically configured to:

obtain the N first feedback information tags based on the N pieces of codebook output information, and update a decoder in the channel feedback model based on the N bitstreams and the N first feedback information tags.

The electronic device 100 of the embodiment of the disclosure may implement corresponding functions of the electronic device in the foregoing method embodiments, and processes, functions, implementations and advantageous effects corresponding to each module (sub-module, unit, or component, etc.) in the electronic device 100 may refer to corresponding descriptions in the foregoing method embodiments, which are not elaborated here. It should be noted that functions described with respect to each module (sub-module, unit, or component, etc.) in the electronic device 100 of the embodiment of the disclosure may be implemented by different modules (sub-modules, units, or components, etc.) or may be implemented by the same module (sub-module, unit, or component, etc.). For example, first and second sending modules may be different modules, or may be the same module, both of which may implement corresponding functions thereof in the embodiment of the disclosure. Furthermore, the communication module in the embodiment of the disclosure may be implemented by a transceiver of the device, and part or all of each of remaining modules may be implemented by a processor of the device.

Figure 24:
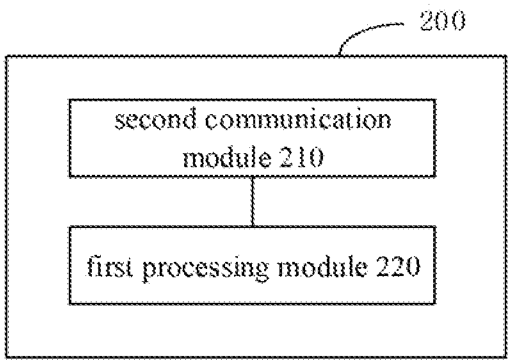
FIG. 24 is a schematic structural block diagram of a network device according to an embodiment of the disclosure.

FIG. 24 is a schematic block diagram of a network device 200 according to an embodiment of the disclosure. The network device 200 may include a second communication module 210 and a first processing module 220.

The second communication module 210 is configured to receive, from a terminal device, N pieces of codebook output information and N bitstreams respectively corresponding to N pieces of channel information, the N bitstreams are obtained by the terminal device respectively processing the N pieces of channel information by using an encoder in a channel feedback model, the N pieces of codebook output information are obtained by the terminal device respectively quantizing, based on a codebook, the N pieces of channel information.

The first processing module 220 is configured to obtain N first feedback information tags based on the N pieces of codebook output information, and update a decoder in the channel feedback model based on the N bitstreams and the N first feedback information tags.

The decoder is configured to perform decoding based on a to-be-decoded bitstream received from the terminal device, to obtain corresponding feedback information.

Optionally, the second communication module 210 is specifically configured to:

in case of sending first indication information to the terminal device and/or receiving second indication information from the terminal device, receive, from the terminal device, the N pieces of codebook output information and the N bitstreams corresponding to the N pieces of channel information, the first indication information and/or the second indication information is used to indicate to update of the channel feedback model.

Optionally, the first indication information is further used to indicate parameters of a training dataset which are used to determine N.

Optionally, the second communication module 210 is further configured to:

send third indication information to the terminal device, the third indication information is used to indicate parameters of a training dataset which are used to determine N.

Optionally, the parameters of the training dataset include the number T of slots and/or the number P of bands.

Optionally, the second communication module 210 is specifically configured to:

periodically receive codebook output information and the bitstream(s) corresponding to the channel information from the terminal device.

Optionally, the second communication module 210 is further configured to:

send fourth indication information to the terminal device, the fourth indication information is used to indicate the terminal device to stop sending the codebook output information and the bitstream(s) corresponding to the channel information.

The network device 200 of the embodiment of the disclosure may implement corresponding functions of the network device in the foregoing method embodiments, and processes, functions, implementations and advantageous effects corresponding to each module (sub-module, unit, or component, etc.) in the network device 200 may refer to corresponding descriptions in the foregoing method embodiments, which are not elaborated here. It should be noted that functions described with respect to each module (sub-module, unit, or component, etc.) in the network device 200 of the embodiment of the disclosure may be implemented by different modules (sub-modules, units, or components, etc.) or may be implemented by the same module (sub-module, unit, or component, etc.). For example, first and second sending modules may be different modules, or may be the same module, both of which may implement corresponding functions thereof in the embodiment of the disclosure. Furthermore, the communication module in the embodiment of the disclosure may be implemented by a transceiver of the device, and part or all of each of remaining modules may be implemented by a processor of the device.

Figure 25:
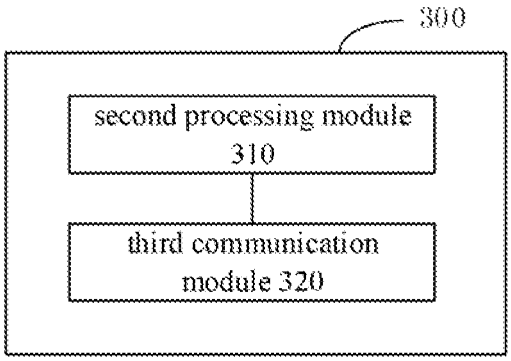
FIG. 25 is a schematic structural block diagram of a terminal device according to an embodiment of the disclosure.

FIG. 25 is a schematic block diagram of a terminal device 300 according to an embodiment of the disclosure. The terminal device 300 may include a second processing module 310 and a third communication module 320.

The second processing module 310 is configured to respectively process N pieces of channel information by using an encoder in a channel feedback model to obtain N bitstreams, and quantize the N pieces of channel information based on a codebook respectively to obtain N pieces of codebook output information.

The third communication module 320 is configured to send the N bitstreams and the N pieces of codebook output information to a network device; the N pieces of codebook output information are used to obtain N first feedback information tags; the N bitstreams and the N first feedback information tags are used by the network device to update a decoder in the channel feedback model, the decoder is configured to perform decoding based on a to-be-decoded bitstream of the terminal device, to obtain corresponding feedback information.

Optionally, the third communication module 320 is specifically configured to: in case of receiving first indication information from the network device or sending second indication information to the network device, send, by the terminal device, the N bitstreams and the N pieces of codebook output information to the network device, the first indication information and/or the second indication information is used to indicate to update the channel feedback model.

Optionally, the first indication information is further used to indicate parameters of a training dataset which are used to determine N.

Optionally, the third communication module 320 is further configured to receive third indication information from the network device, the third indication information is used to indicate parameters of a training dataset which are used to determine N.

Optionally, the second processing module 310 is further configured to determine, based on the parameters of the training dataset, to send the N pieces of codebook output information and the N bitstreams to the network device based on N pieces of channel information on T slots and/or P bands.

Optionally, the third communication module 320 is specifically configured to periodically send codebook output information and bitstream(s) corresponding to the channel information to the network device.

Optionally, the third communication module 320 is further configured to: in case of receiving fourth indication information from the network device, stop sending the codebook output information and bitstream(s) corresponding to the channel information.

The terminal device 300 of the embodiment of the disclosure may implement corresponding functions of the terminal device in the foregoing method embodiments, and processes, functions, implementations and advantageous effects corresponding to each module (sub-module, unit, or component, etc.) in the terminal device 300 may refer to corresponding descriptions in the foregoing method embodiments, which are not elaborated here. It should be noted that functions described with respect to each module (sub-module, unit, or component, etc.) in the terminal device 300 of the embodiment of the disclosure may be implemented by different modules (sub-modules, units, or components, etc.) or may be implemented by the same module (sub-module, unit, or component, etc.). For example, first and second sending modules may be different modules, or may be the same module, both of which may implement corresponding functions thereof in the embodiment of the disclosure. Furthermore, the communication module in the embodiment of the disclosure may be implemented by a transceiver of the device, and part or all of each of remaining modules may be implemented by a processor of the device.

Figure 26:
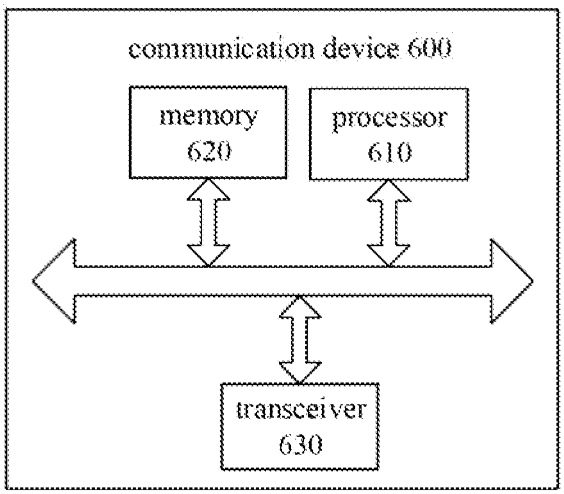
FIG. 26 is a schematic block diagram of a communication device according to an embodiment of the disclosure.

FIG. 26 is a schematic structural diagram of a communication device 600 according to an embodiment of the disclosure, the communication device 600 includes a processor 610, and the processor 610 may call and run a computer program from a memory, to implement the methods in the embodiments of the disclosure.

Optionally, the communication device 600 may further include a memory 620. The processor 610 may call and run a computer program from the memory 620, to implement the methods in the embodiments of the disclosure.

The memory 620 may be a separate device independent of the processor 610, or may be integrated in the processor 610.

Optionally, the communication device 600 may further include a transceiver 630, and the processor 610 may control the transceiver 630 to communicate with other devices, specifically, the processor 610 may control the transceiver 630 to send information or data to other devices, or receive information or data from other devices.

The transceiver 630 may include a transmitter and a receiver. The transceiver 630 may further include antennas, and there may be one or more antennas in number.

Optionally, the communication device 600 may be the electronic device of the embodiment of the disclosure, and the communication device 600 may implement corresponding processes implemented by the electronic device in each of the methods of the embodiments of the disclosure, which are not elaborated here for the sake of brevity.

Optionally, the communication device 600 may be the network device of the embodiment of the disclosure, and the communication device 600 may implement corresponding processes implemented by the network device in each of the methods of the embodiments of the disclosure, which are not elaborated here for the sake of brevity.

Optionally, the communication device 600 may be the terminal device of the embodiment of the disclosure, and the communication device 600 may implement corresponding processes implemented by the terminal device in each of the methods of the embodiments of the disclosure, which are not elaborated here for the sake of brevity.

Figure 27:
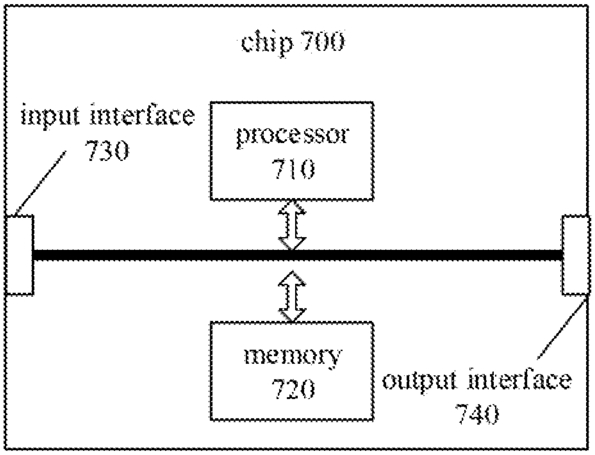
FIG. 27 is a schematic block diagram of a chip according to an embodiment of the disclosure.

FIG. 27 is a schematic structural diagram of a chip 700 according to an embodiment of the disclosure, the chip 700 includes a processor 710, and the processor 710 may call and run a computer program from a memory, to implement the methods in the embodiments of the disclosure.

Optionally, the chip 700 may further include a memory 720. The processor 710 may call and run a computer program from the memory 720, to implement the methods in the embodiments of the disclosure.

The memory 720 may be a separate device independent of the processor 710, or may be integrated in the processor 710.

Optionally, the chip 700 may further include an input interface 730. The processor 710 may control the input interface 730 to communicate with other devices or chips, specifically, the processor 710 may control the input interface 730 to obtain information or data sent by other devices or chips.

Optionally, the chip 700 may further include an output interface 740. The processor 710 may control the output interface 740 to communicate with other devices or chips, specifically, the processor 710 may control the output interface 740 to output information or data to other devices or chips.

Optionally, the chip may be applied to the electronic device of the embodiment of the disclosure, and the chip may implement corresponding processes implemented by the electronic device in each of the methods of the embodiments of the disclosure, which are not elaborated here for the sake of brevity.

Optionally, the chip may be applied to the network device of the embodiment of the disclosure, and the chip may implement corresponding processes implemented by the network device in each of the methods of the embodiments of the disclosure, which are not elaborated here for the sake of brevity.

Optionally, the chip may be applied to the terminal device of the embodiment of the disclosure, and the chip may implement corresponding processes implemented by the terminal device in each of the methods of the embodiments of the disclosure, which are not elaborated here for the sake of brevity.

It should be understood that the chip mentioned in the embodiment of the disclosure may also be referred to as a system-level chip, a system chip, a chip system, or a system-on-chip, etc.

The processor as mentioned above may be a general-purpose processor, a Digital Signal Processor (DSP), a Field Programmable Gate Array (FPGA), an Application Specific Integrated Circuit (ASIC) or other programmable logic devices, a transistor logic device, a discrete hardware component, etc. The general-purpose processor as mentioned above may be a microprocessor, or may be any conventional processor, etc.

The memory as mentioned above may be a volatile memory or a non-volatile memory, or may include both the volatile memory and the non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM).

It should be understood that the above memory is an exemplary description rather than limitation. For example, the memory in the embodiment of the disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), a Direct Rambus RAM (DR RAM), etc. That is, the memory in the embodiment of the disclosure is intended to include, but is not limited to these and any other suitable types of memories.

Figure 28:
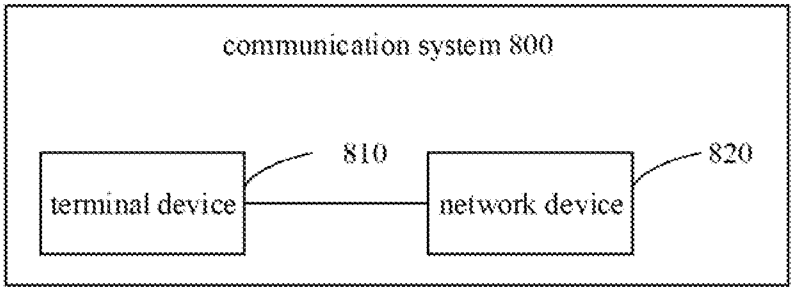
FIG. 28 is a schematic block diagram of a communication system according to an embodiment of the disclosure.

FIG. 28 is a schematic block diagram of a communication system 800 according to an embodiment of the disclosure. The communication system 800 includes a terminal device 810 and a network device 820.

The terminal device 810 is configured to: respectively process N pieces of channel information by using an encoder in a channel feedback model to obtain N bitstreams, and quantize the N pieces of channel information based on a codebook respectively to obtain N pieces of codebook output information; and send the N bitstreams and the N pieces of codebook output information to a network device. The network device 820 is configured to: receive, from a terminal device, N pieces of codebook output information and N bitstreams respectively corresponding to N pieces of channel information; and obtain N first feedback information tags based on the N pieces of codebook output information; and update a decoder in the channel feedback model based on the N bitstreams and the N first feedback information tags. The decoder is configured to perform decoding based on a to-be-decoded bitstream received from the terminal device, to obtain corresponding feedback information.

The terminal device 810 may be configured to implement corresponding functions implemented by the terminal device in the method of each of the embodiments of the disclosure, and the network device 820 may be configured to implement corresponding functions implemented by the network device in the method of each of the embodiments of the disclosure, which are not elaborated here for the sake of brevity.

All or part of the above embodiments may be implemented by software, hardware, firmware or any combination thereof. When the above embodiments are implemented with software, all or part of the above embodiments may be implemented in form of a computer program product. The computer program product includes one or more computer instructions. When the computer program instructions are loaded and executed on a computer, all or part of the processes or functions according to the embodiments of the disclosure are generated. The computer may be a general-purpose computer, a special-purpose computer, a computer network, or other programmable devices. The computer instructions may be stored in a computer-readable storage medium, or transmitted from a computer-readable storage medium to another computer-readable storage medium. For example, the computer instructions may be transmitted from a website, computer, server or data center to another website, computer, server or data center through a wired manner (such as a coaxial cable, an optical fiber, a Digital Subscriber Line (DSL)) or a wireless mode (such as infrared, wireless, microwave, etc.). The computer-readable storage medium may be any available medium which may be accessed by the computer, or a data storage device including a server, data center or the like integrated with one or more available media. The available medium may be a magnetic medium (such as a floppy disk, a hard disk, a magnetic tape), an optical medium (such as a Digital Video Disc (DVD)), or a semiconductor medium (such as a Solid State Disk (SSD)), etc.

It should be understood that in various embodiments of the disclosure, size of a serial number of each of the above processes does not mean an order of execution. The execution order of each of the processes should be determined by its function and internal logic, and should not constitute any limitation to implementation of the embodiments of the disclosure.

It may be understood clearly by those skilled in the art that for the convenience and brevity of descriptions, specific operation processes of the above system, device and unit may refer to corresponding processes in the foregoing method embodiments, which are not elaborated here.

The above descriptions are only specific implementations of the disclosure, however, the scope of protection of the disclosure is not limited thereto. Variations or replacements easily conceived by any technician familiar with this technical field within the technical scope disclosed in the disclosure, should fall within the scope of protection of the disclosure. Therefore, the scope of protection of the disclosure shall be subjected to the scope of protection of the claims.

The invention claimed is:

1. An electronic device, comprising a processor and a memory configured to store a computer program, wherein the processor is configured to call and run the computer program stored in the memory to control the electronic device to:

update a channel feedback model based on N first feedback information tags respectively corresponding to N pieces of channel information, wherein the N first feedback information tags comprise N pieces of codebook output information obtained by respectively quantizing, based on a codebook, the N pieces of channel information, the channel feedback model is used to obtain corresponding feedback information based on channel information which needs to be feedback, and N is an integer greater than or equal to 1, wherein the processor is further configured to call and run the computer program stored in the memory to control the electronic device to:

obtain N second feedback information tags corresponding to the N pieces of channel information based on the N pieces of channel information; and update the channel feedback model based on N pieces of feedback information respectively corresponding to the N pieces of channel information, the N first feedback information tags respectively corresponding to the N pieces of channel information, and the N second feedback information tags respectively corresponding to the N pieces of channel information, wherein the N pieces of feedback information are obtained by respectively processing the N pieces of channel information by using the channel feedback model, wherein the N first feedback information tags are obtained by quantizing the N pieces of the channel information by the electronic device based on a first codebook, the N second feedback information tags are obtained by quantizing the N pieces of the channel information by the electronic device based on a second codebook, and the first codebook is different from the second codebook.

2. The electronic device of claim 1, wherein the channel feedback model comprises an encoder and a decoder;

the encoder is used by a terminal device to perform encoding based on the channel information which needs to be feedback to obtain a corresponding bitstream; and the decoder is used by a network device to perform decoding based on the corresponding bitstream to obtain corresponding feedback information.

3. The electronic device of claim 1, wherein the processor is further configured to call and run the computer program stored in the memory to control the electronic device to:

process an i-th piece of channel information of the N pieces of channel information by using the channel feedback model, to obtain feedback information corresponding to the i-th piece of channel information, wherein i is a positive integer less than or equal to N;

determine a first loss function corresponding to the i-th piece of channel information based on the feedback information and a first feedback information tag corresponding to the i-th piece of channel information; and determine a second loss function corresponding to the i-th piece of channel information based on the feedback information and a second feedback information tag corresponding to the i-th piece of channel information, wherein the first loss function and the second loss function are used to update the channel feedback model.

4. The electronic device of claim 1, wherein the processor is further configured to call and run the computer program stored in the memory to control the electronic device to:

determine a third loss function based on X first loss functions respectively corresponding to X pieces of channel information, Y second loss functions respectively corresponding to Y pieces of channel information, and a preset weight; wherein each of X and Y is a positive integer less than or equal to N; and update the channel feedback model based on the third loss function.

5. The electronic device of claim 1, wherein the N pieces of channel information comprise at least one piece of channel information in each of K communication scenarios, K is an integer greater than or equal to 1, wherein the processor is further configured to call and run the computer program stored in the memory to control the electronic device to:

obtain at least one second feedback information tag in a j-th communication scenario of the K communication scenarios based on at least one piece of channel information in the j-th communication scenario, j is a positive integer less than or equal to K; and perform transfer learning on the channel feedback model based on the at least one second feedback information tag and at least one piece of feedback information respectively corresponding to the at least one piece of channel information in the j-th communication scenario; wherein the at least one piece of feedback information is obtained by respectively processing the at least one piece of channel information by using the channel feedback model, the channel feedback model after the transfer learning is used to obtain corresponding feedback information based on channel information which needs to be feedback in the j-th communication scenario.

6. The electronic device of claim 5, wherein the channel feedback model comprises M network layers, the processor is further configured to call and run the computer program stored in the memory to:

update parameters of L network layers in the channel feedback model, wherein M is an integer greater than or equal to 1, and L is an integer less than or equal to M.

7. The electronic device of claim 6, wherein the L network layers are last L network layers of the M network layers.

8. The electronic device of claim 1, wherein the electronic device is a network device, and the network device further comprises a transceiver configured to:

receive, from a terminal device, the N pieces of codebook output information and N bitstreams respectively corresponding to the N pieces of channel information, wherein the N bitstreams are obtained by the terminal device respectively processing the N pieces of channel information by using an encoder in the channel feedback model respectively, wherein the processor is further configured to call and run the computer program stored in the memory to:

obtain the N first feedback information tags based on the N pieces of codebook output information, and update a decoder in the channel feedback model based on the N bitstreams and the N first feedback information tags.

9. A network device, comprising a transceiver, a processor and a memory configured to store a computer program, wherein the processor is configured to call and run the computer program stored in the memory to control the network device to:

receive, from a terminal device, N pieces of codebook output information and N bitstreams respectively corresponding to N pieces of channel information, wherein the N bitstreams are obtained by the terminal device respectively processing the N pieces of channel information by using an encoder in a channel feedback model, the N pieces of codebook output information are obtained by the terminal device respectively quantizing, based on a codebook, the N pieces of channel information, wherein N is an integer greater than or equal to 1; and obtain N first feedback information tags based on the N pieces of codebook output information, and update a decoder in the channel feedback model based on the N bitstreams and the N first feedback information tags, wherein the decoder is configured to perform decoding based on a to-be-decoded bitstream received from the terminal device, to obtain corresponding feedback information, wherein the channel feedback model is updated by the terminal device based on N pieces of feedback information respectively corresponding to the N pieces of channel information, the N first feedback information tags respectively corresponding to the N pieces of channel information, and N second feedback information tags respectively corresponding to the N pieces of channel information, wherein the N pieces of feedback information are obtained by respectively processing the N pieces of channel information by using the channel feedback model, wherein the N first feedback information tags are obtained by quantizing the N pieces of the channel information by the terminal device based on a first codebook, the N second feedback information tags are obtained by quantizing the N pieces of the channel information by the terminal device based on a second codebook, and the first codebook is different from the second codebook.

10. The network device of claim 9, wherein the processor is configured to call and run the computer program stored in the memory to control the network device to:

after sending first indication information to the terminal device and/or receiving second indication information from the terminal device, receive, from the terminal device, the N pieces of codebook output information and the N bitstreams respectively corresponding to the N pieces of channel information, wherein the first indication information and/or the second indication information is used to indicate to update the channel feedback model.

11. The network device of claim 10, wherein the first indication information is further used to indicate parameters of a training dataset which are used to determine N.

12. The network device of claim 11, wherein the parameters of the training dataset comprise a number T of slots and/or a number P of bands.

13. The network device of claim 9, wherein the processor is configured to call and run the computer program stored in the memory to control the network device to:

send third indication information to the terminal device, wherein the third indication information is used to indicate parameters of a training dataset which are used to determine N.

14. A terminal device, comprising a transceiver, a processor and a memory configured to store a computer program, wherein the processor is configured to call and run the computer program stored in the memory to control the terminal device to:

respectively process N pieces of channel information by using an encoder in a channel feedback model to obtain N bitstreams; and quantize the N pieces of channel information based on a codebook respectively to obtain N pieces of codebook output information; and send the N bitstreams and the N pieces of codebook output information to a network device, wherein the N pieces of codebook output information are used to obtain N first feedback information tags, the N bitstreams and the N first feedback information tags are used by the network device to update a decoder in the channel feedback model, and the decoder is configured to perform decoding based on a to-be-decoded bitstream of the terminal device to obtain corresponding feedback information, wherein N is an integer greater than or equal to 1, wherein the processor is further configured to call and run the computer program stored in the memory to control the terminal device to:

obtain N second feedback information tags corresponding to the N pieces of channel information based on the N pieces of channel information; and update the channel feedback model based on N pieces of feedback information respectively corresponding to the N pieces of channel information, the N first feedback information tags respectively corresponding to the N pieces of channel information, and the N second feedback information tags respectively corresponding to the N pieces of channel information, wherein the N pieces of feedback information are obtained by respectively processing the N pieces of channel information by using the channel feedback model, wherein the N first feedback information tags are obtained by quantizing the N pieces of the channel information by the terminal device based on a first codebook, the N second feedback information tags are obtained by quantizing the N pieces of the channel information by the terminal device based on a second codebook, and the first codebook is different from the second codebook.

15. The terminal device of claim 14, wherein the processor is configured to call and run the computer program stored in the memory to control the terminal device to:

after receiving first indication information from the network device or sending second indication information to the network device, send, by the terminal device, the N bitstreams and the N pieces of codebook output information to the network device, wherein the first indication information and/or the second indication information is used to indicate to update the channel feedback model.

16. The terminal device of claim 15, wherein the first indication information is further used to indicate parameters of a training dataset which are used to determine N.

17. The terminal device of claim 16, wherein the processor is configured to call and run the computer program stored in the memory to control the terminal device to:

determine, based on the parameters of the training dataset, to send the N pieces of codebook output information and the N bitstreams to the network device based on N pieces of channel information on T slots and/or P bands.

18. The terminal device of claim 14, wherein the processor is configured to call and run the computer program stored in the memory to control the terminal device to:

receive third indication information from the network device, wherein the third indication information is used to indicate parameters of a training dataset which are used to determine N.

19. The terminal device of claim 14, wherein the processor is configured to call and run the computer program stored in the memory to control the terminal device to:

periodically send codebook output information and a bitstream corresponding to channel information to the network device.

* * * * *